(12) United States Patent
    Terre

(10) Patent No.: US 10,232,237 B2
(45) Date of Patent: Mar. 19, 2019

(54) THERMAL-ASSISTED GOLF RANGEFINDER SYSTEMS AND METHODS

(71) Applicant: FLIR Systems, Inc., Wilsonville, OR (US)

(72) Inventor: William A. Terre, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 519 days.

(21) Appl. No.: 14/850,667

(22) Filed: Sep. 10, 2015

(65) Prior Publication Data

US 2016/0074724 A1    Mar. 17, 2016

Related U.S. Application Data

(60) Provisional application No. 62/050,726, filed on Sep. 15, 2014.

(51) Int. Cl.
| | |
|---|---|
| A63B 57/30 | (2015.01) |
| G01S 3/784 | (2006.01) |
| G01S 3/788 | (2006.01) |
| G01S 17/88 | (2006.01) |
| G01S 17/66 | (2006.01) |
| G01S 17/08 | (2006.01) |
| G01S 17/02 | (2006.01) |
| A63B 71/06 | (2006.01) |
| G01S 7/51 | (2006.01) |

(52) U.S. Cl.
CPC ............ *A63B 57/357* (2015.10); *G01S 3/784* (2013.01); *G01S 7/51* (2013.01); *G01S 17/023* (2013.01); *G01S 17/08* (2013.01); *G01S 17/66* (2013.01); *G01S 17/88* (2013.01); *A63B 2071/0694* (2013.01)

(58) Field of Classification Search
CPC .......... G01S 3/784; G01S 7/51; G01S 17/023; G01S 17/08; G01S 17/66; G01S 17/88; A63B 57/357
See application file for complete search history.

(56) References Cited

U.S. PATENT DOCUMENTS

| | | | | |
|---|---|---|---|---|
| 4,279,599 A | * | 7/1981 | Marshall | ..................... F41J 2/02 273/348 |
| 5,046,839 A | * | 9/1991 | Krangle | ................ G01S 7/4812 356/5.05 |

(Continued)

*Primary Examiner* — Eric L Bolda
(74) *Attorney, Agent, or Firm* — Haynes and Boone, LLP

(57) ABSTRACT

Methods, apparatuses, and systems for determining a range on a golf course are disclosed. Methods may utilize infrared imaging to assist in determining a range. An infrared image (e.g., a thermal image) of a portion of a golf course that includes a flagstick is captured. The flagstick includes a thermal target. The thermal target of the flagstick is detected based on the infrared image. A light is emitted to the flagstick based on the detected thermal target. The light reflected from the flagstick is detected. A distance to the flagstick is calculated based on the detected light and the distance is provided. An apparatus for performing the methods may be a thermal-assisted rangefinder that includes an infrared imaging module, a light source, a light detector, a visible light optical device, and a processor. The visible light optical device may include a lens, a display, and/or a visible light camera.

20 Claims, 19 Drawing Sheets

(56) References Cited

U.S. PATENT DOCUMENTS

| | | | | |
|---|---|---|---|---|
| 5,898,484 | A * | 4/1999 | Harris | G01C 3/04 356/143 |
| 7,820,967 | B2 * | 10/2010 | DeMarco | G01C 3/08 250/330 |
| 2007/0174152 | A1 * | 7/2007 | Bjornberg | G01C 15/00 705/28 |
| 2010/0187845 | A1 * | 7/2010 | Larson | B66C 1/10 294/92 |
| 2010/0309315 | A1 * | 12/2010 | Hogasten | H04N 5/33 348/164 |
| 2012/0224063 | A1 * | 9/2012 | Terre | G08B 13/1963 348/148 |
| 2014/0092476 | A1 * | 4/2014 | Ando | G02B 27/646 359/554 |

* cited by examiner

THERMAL-ASSISTED GOLF RANGEFINDER SYSTEMS AND METHODS

CROSS-REFERENCE TO RELATED APPLICATIONS

This application claims the benefit of U.S. Provisional Patent Application No. 62/050,726 filed Sep. 15, 2014 and entitled "THERMAL-ASSISTED GOLF RANGEFINDER" which is hereby incorporated by reference in its entirety.

U.S. patent application Ser. No. 12/477,828 filed Jun. 3, 2009 and entitled "INFRARED CAMERA SYSTEMS AND METHODS FOR DUAL SENSOR APPLICATIONS" is hereby incorporated by reference in its entirety.

U.S. patent application Ser. No. 12/766,739 filed Apr. 23, 2010 and entitled "INFRARED RESOLUTION AND CONTRAST ENHANCEMENT WITH FUSION" is hereby incorporated by reference in its entirety.

U.S. Provisional Patent Application No. 61/473,207 filed Apr. 8, 2011 and entitled "INFRARED RESOLUTION AND CONTRAST ENHANCEMENT WITH FUSION" is hereby incorporated by reference in its entirety.

International Patent Application No. PCT/EP2011/056432 filed Apr. 21, 2011 and entitled "INFRARED RESOLUTION AND CONTRAST ENHANCEMENT WITH FUSION" is hereby incorporated by reference in its entirety.

U.S. patent application Ser. No. 13/105,765 filed May 11, 2011 and entitled "INFRARED RESOLUTION AND CONTRAST ENHANCEMENT WITH FUSION" is hereby incorporated by reference in its entirety.

U.S. Provisional Patent Application No. 61/495,873 filed Jun. 10, 2011 and entitled "INFRARED CAMERA PACKAGING SYSTEMS AND METHODS" is hereby incorporated by reference in its entirety.

U.S. Provisional Patent Application No. 61/495,879 filed Jun. 10, 2011 and entitled "INFRARED CAMERA SYSTEM ARCHITECTURES" is hereby incorporated by reference in its entirety.

U.S. Provisional Patent Application No. 61/495,888 filed Jun. 10, 2011 and entitled "INFRARED CAMERA CALIBRATION TECHNIQUES" is hereby incorporated by reference in its entirety.

U.S. Provisional Patent Application No. 61/545,056 filed Oct. 7, 2011 and entitled "NON-UNIFORMITY CORRECTION TECHNIQUES FOR INFRARED IMAGING DEVICES" is hereby incorporated by reference in its entirety.

U.S. patent application Ser. No. 13/437,645 filed Apr. 2, 2012 and entitled "INFRARED RESOLUTION AND CONTRAST ENHANCEMENT WITH FUSION" is hereby incorporated by reference in its entirety.

U.S. Provisional Patent Application No. 61/656,889 filed Jun. 7, 2012 and entitled "LOW POWER AND SMALL FORM FACTOR INFRARED IMAGING" is hereby incorporated by reference in its entirety.

International Patent Application No. PCT/US2012/041739 filed Jun. 8, 2012 and entitled "INFRARED CAMERA SYSTEM ARCHITECTURES" is hereby incorporated by reference in its entirety.

International Patent Application No. PCT/US2012/041744 filed Jun. 8, 2012 and entitled "LOW POWER AND SMALL FORM FACTOR INFRARED IMAGING" is hereby incorporated by reference in its entirety.

International Patent Application No. PCT/US2012/041749 filed Jun. 8, 2012 and entitled "NON-UNIFORMITY CORRECTION TECHNIQUES FOR INFRARED IMAGING DEVICES" is hereby incorporated by reference in its entirety.

U.S. Provisional Patent Application No. 61/746,069 filed Dec. 26, 2012 and entitled "TIME SPACED INFRARED IMAGE ENHANCEMENT" is hereby incorporated by reference in its entirety.

U.S. Provisional Patent Application No. 61/746,074 filed Dec. 26, 2012 and entitled "INFRARED IMAGING ENHANCEMENT WITH FUSION" is hereby incorporated by reference in its entirety.

U.S. Provisional Patent Application No. 61/748,018 filed Dec. 31, 2012 and entitled "COMPACT MULTI-SPECTRUM IMAGING WITH FUSION" is hereby incorporated by reference in its entirety.

U.S. Provisional Patent Application No. 61/792,582 filed Mar. 15, 2013 and entitled "TIME SPACED INFRARED IMAGE ENHANCEMENT" is hereby incorporated by reference in its entirety.

U.S. Provisional Patent Application No. 61/793,952 filed Mar. 15, 2013 and entitled "INFRARED IMAGING ENHANCEMENT WITH FUSION" is hereby incorporated by reference in its entirety.

U.S. patent application Ser. No. 14/099,818 filed Dec. 6, 2013 and entitled "NON-UNIFORMITY CORRECTION TECHNIQUES FOR INFRARED IMAGING DEVICES" is hereby incorporated by reference in its entirety.

U.S. patent application Ser. No. 14/101,245 filed Dec. 9, 2013 and entitled "LOW POWER AND SMALL FORM FACTOR INFRARED IMAGING" is hereby incorporated by reference in its entirety.

U.S. patent application Ser. No. 14/101,258 filed Dec. 9, 2013 and entitled "INFRARED CAMERA SYSTEM ARCHITECTURES" is hereby incorporated by reference in its entirety.

U.S. patent application Ser. No. 14/138,040 filed Dec. 21, 2013 and entitled "TIME SPACED INFRARED IMAGE ENHANCEMENT" is hereby incorporated by reference in its entirety.

U.S. patent application Ser. No. 14/138,052 filed Dec. 21, 2013 and entitled "INFRARED IMAGING ENHANCEMENT WITH FUSION" is hereby incorporated by reference in its entirety.

U.S. patent application Ser. No. 14/138,058 filed Dec. 21, 2013 and entitled "COMPACT MULTI-SPECTRUM IMAGING WITH FUSION" is hereby incorporated by reference in its entirety.

U.S. patent application Ser. No. 14/299,987 filed Jun. 9, 2014 and entitled "INFRARED CAMERA SYSTEMS AND METHODS FOR DUAL SENSOR APPLICATIONS" is hereby incorporated by reference in its entirety.

U.S. patent application Ser. No. 14/506,430 filed Oct. 3, 2014 and entitled "WEARABLE IMAGING DEVICES, SYSTEMS, AND METHODS" is hereby incorporated by reference in its entirety.

TECHNICAL FIELD

One or more embodiments of the invention relate generally to systems and methods for determining a range on a golf course and more particularly, for example, to systems and methods for determining a range assisted by infrared imaging.

BACKGROUND

The estimation of a distance from an observer to a target has been aided by the introduction of rangefinders. A rangefinder measures a range, such as the distance from an observer to a target. A rangefinder typically includes a laser that emits a laser beam to determine the range based on a measurement of a time of flight of the laser beam. The time of flight is the time taken for the laser beam to travel to the target and back. The accuracy of the measurement depends on various factors including whether the laser beam is reflected from the intended target and can be negatively affected if the laser beam is reflected from another object. However, it may be challenging to point the laser exactly on the target. It may be especially challenging when the target is far away and the target is small or narrow as observed from a distance.

Handheld golf rangefinders are used to determine a distance from an observer on a golf course to a flagstick or pin on the green. Flagsticks may include optical retroreflectors to assist in achieving a returned light beam signal from the rangefinder. However, in order for an observer with a rangefinder to determine the distance to the flagstick, the observer must point the laser exactly on the flagstick to measure the distance. Aiming the laser at the flagstick in this way may be challenging, particularly when the flagstick is at a large distance and therefore appears narrow and far away from the observer.

It would therefore be desirable to provide improved methods, apparatuses, and systems to determine a distance to a flagstick on a golf course.

SUMMARY

Methods, apparatuses, and systems for determining a range on a golf course are disclosed, in accordance with one or more embodiments. A range is a distance between an observer and a target, such as a flagstick.

In various embodiments, systems and methods may be provided in which infrared imaging may be used to assist in determining a range. A system such as a rangefinder system may include a thermal imaging module, a light source such as a laser, and a receiver for detecting reflected portions of light emitted from the light sources according to various embodiments. The system may also include a processor for processing thettnal images from the thermal imaging module and received reflected portions of the light to determine a range. The system may also include a display. The system may also include a visible light imager.

In various embodiments, an infrared image (e.g., a thermal image) of a portion of a golf course that includes a flagstick with a thermal target may be captured. The thermal target of the flagstick may be detected based on the infrared image. Light (e.g., a light beam such as a laser beam) may be emitted toward the flagstick based on the detected thermal target. Some or all of the light may be reflected from the flagstick back to the receiver and detected. A distance to the flagstick may be calculated based on the detected reflected light and the distance may be provided.

In an embodiment, alignment guide information is generated and provided based on the infrared image and the detected thermal target. The alignment guide information includes, for example, a user-viewable cue indicating how to direct a light source to emit the light to the flag stick. The user-viewable cue may include a graphic (e.g., a directional arrow), a text, a framing reticle, etc., that is presented on a display. In another embodiment, the thermal target is tracked based on the infrared image and the detected thermal target. A direction of emission of the light source may be adjusted to emit the light to the flagstick based on the tracked thermal target.

In some embodiments, a visible light image of the portion of the golf course is captured. A combined image of the visible light image and the infrared image may be generated. The combined image may be presented on a display of the rangefinder system. The combined image may be, for example, a contrast enhanced version of the infrared image with additional visible light image data.

In various embodiments, an apparatus for performing the method for determining the range is a thermal-assisted rangefinder that includes: an infrared imaging module configured to capture an infrared image of a portion of a golf course and a flagstick with a thermal target; a light source (e.g., a laser) configured to emit a light to the flagstick; a light detector configured to detect the light reflected from the flagstick; a visible light optical device configured to magnify the portion of the golf course; and a processor configured to communicate with the infrared imaging module. The processor detects the thermal target of the flagstick, calculates the distance to the target based on the detected light, and provides the distance. The processor may detect the thermal target of the flagstick by, for example, performing object detection operations using the infrared images to detect objects in the infrared images.

In an embodiment, the processor generates alignment guide information based on the infrared images. The alignment guide information may include a user-viewable cue indicating how to direct the light source to emit the light to the flagstick based on the infrared image and the detected thermal target. The processor may present the user-viewable cue on the visible light optical device. In another embodiment, the processor operates to track the thermal target based on the infrared image and the detected thermal target, and adjust a direction of the light source to emit the light to the flagstick based on the tracked thermal target.

The visible light optical device may include a lens for optical magnification, a display, and/or a visible light camera configured to capture a visible light image of the portion of the golf course. The visible light image, a magnification of the visible light image, and/or the user-viewable cue may be presented on the display. In some embodiments, the processor generates a combined image of the visible light image and the infrared image, and presents the combined image on the display.

In various embodiments, a flagstick includes a flag, a thermal target configured to emit thermal radiation, and a stick. The flag and the thermal target are located closer to one end of the flagstick, and the other end of the flagstick is adapted to be placed in a golf hole so that the flagstick extends upward from the hole to be visible to a rangefinder.

In various embodiments, a system includes a thermal-assisted range finder and a flagstick with a thermal target to perform the methods for determining the range.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
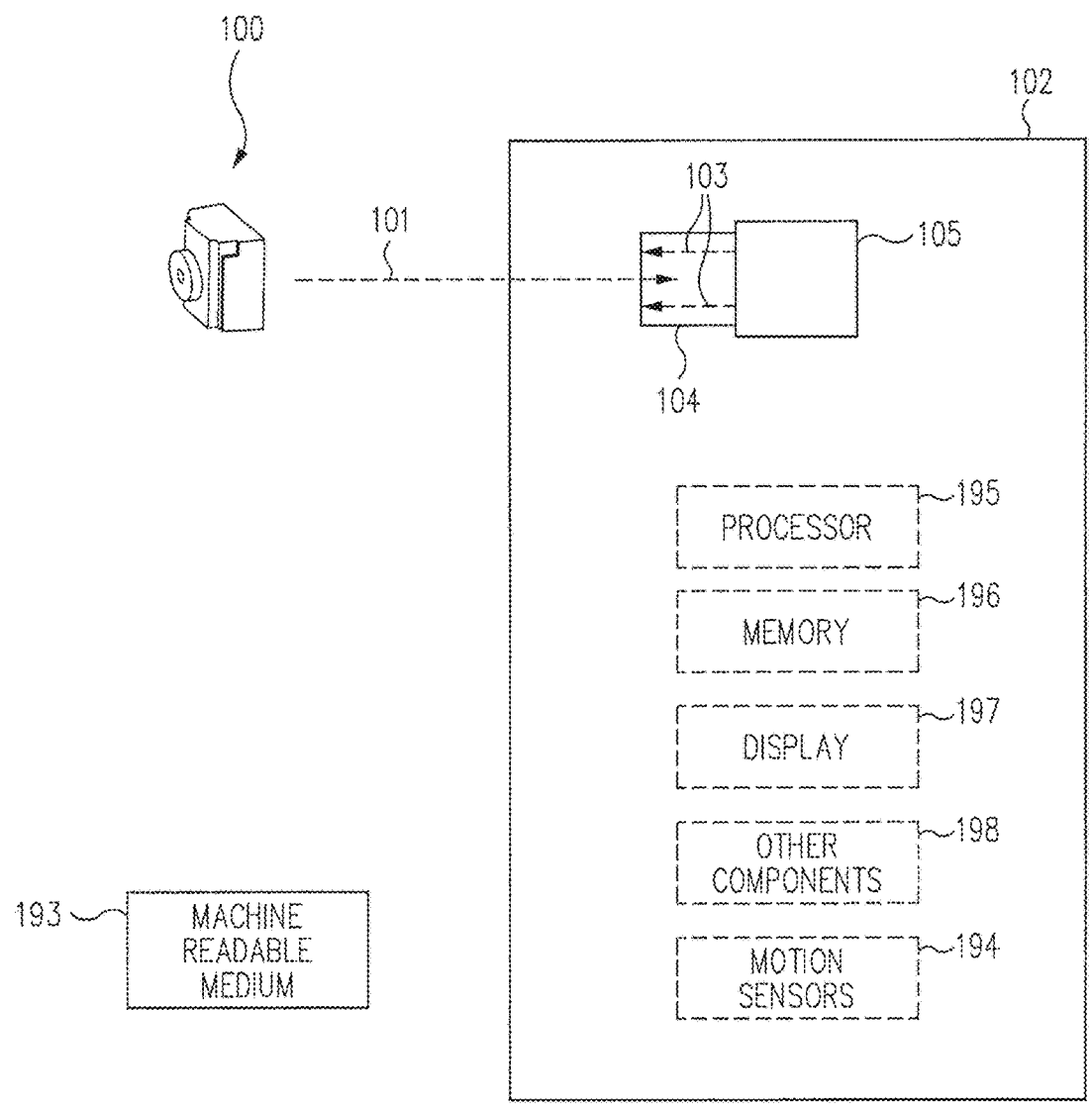
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, a wearable imaging device, a rangefinder, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
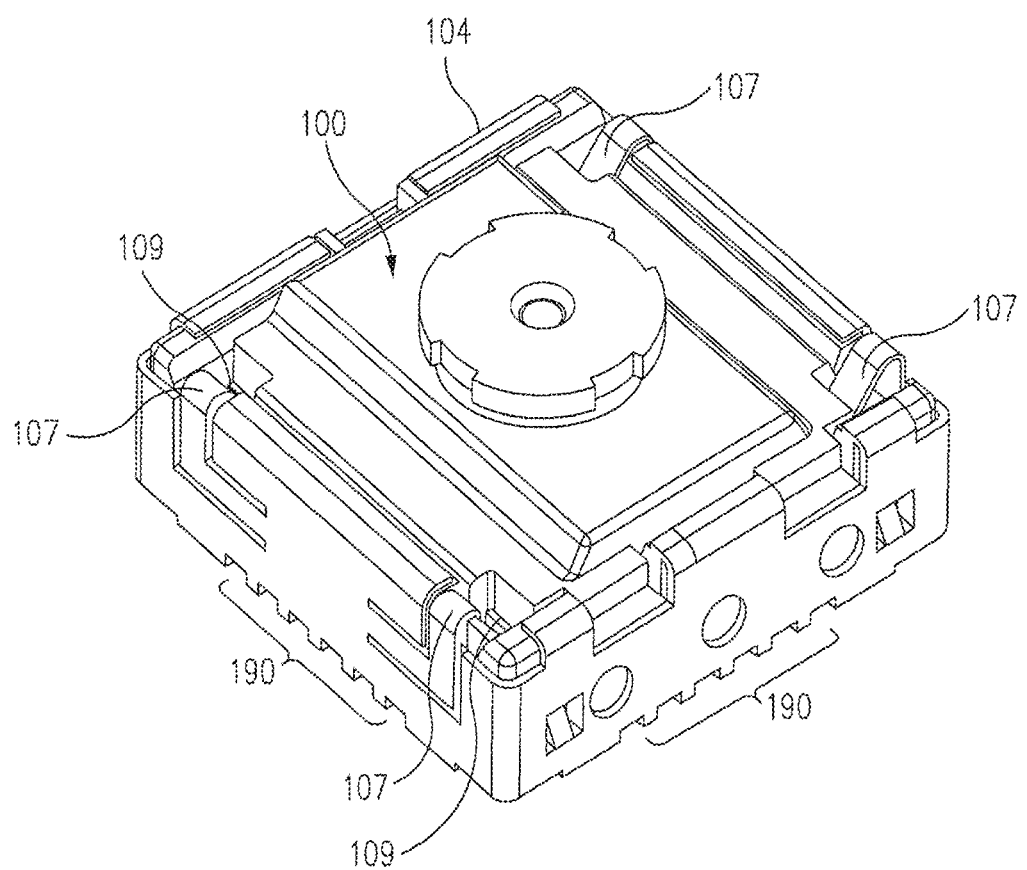
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
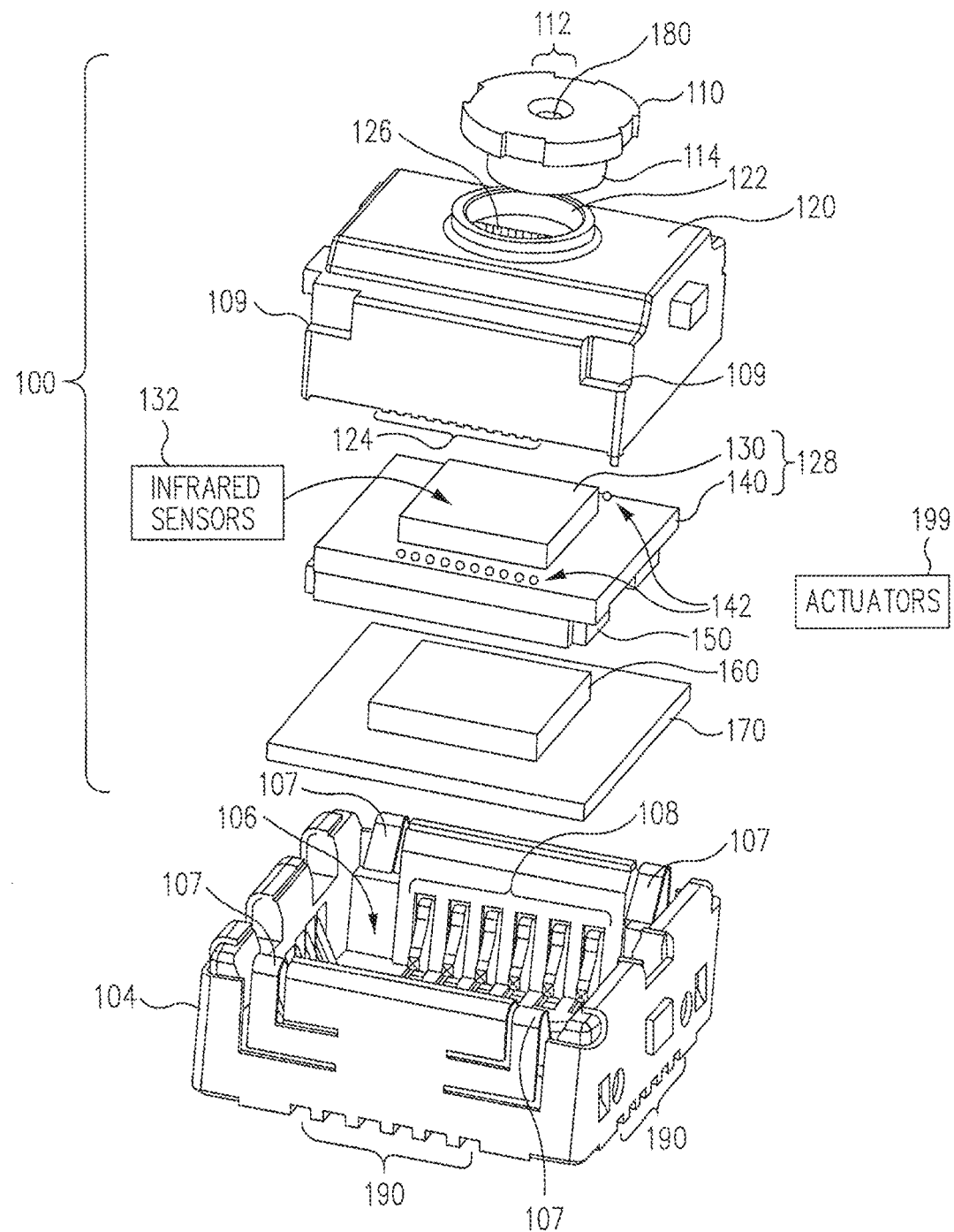
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
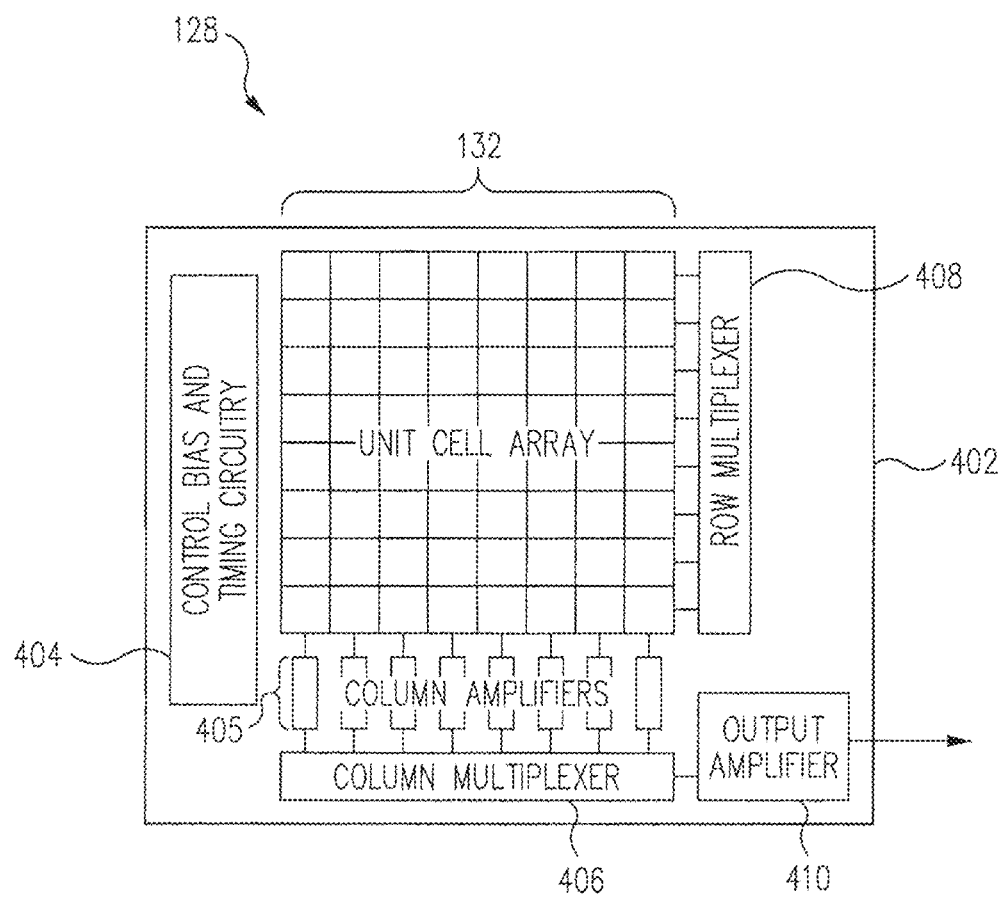
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126' in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
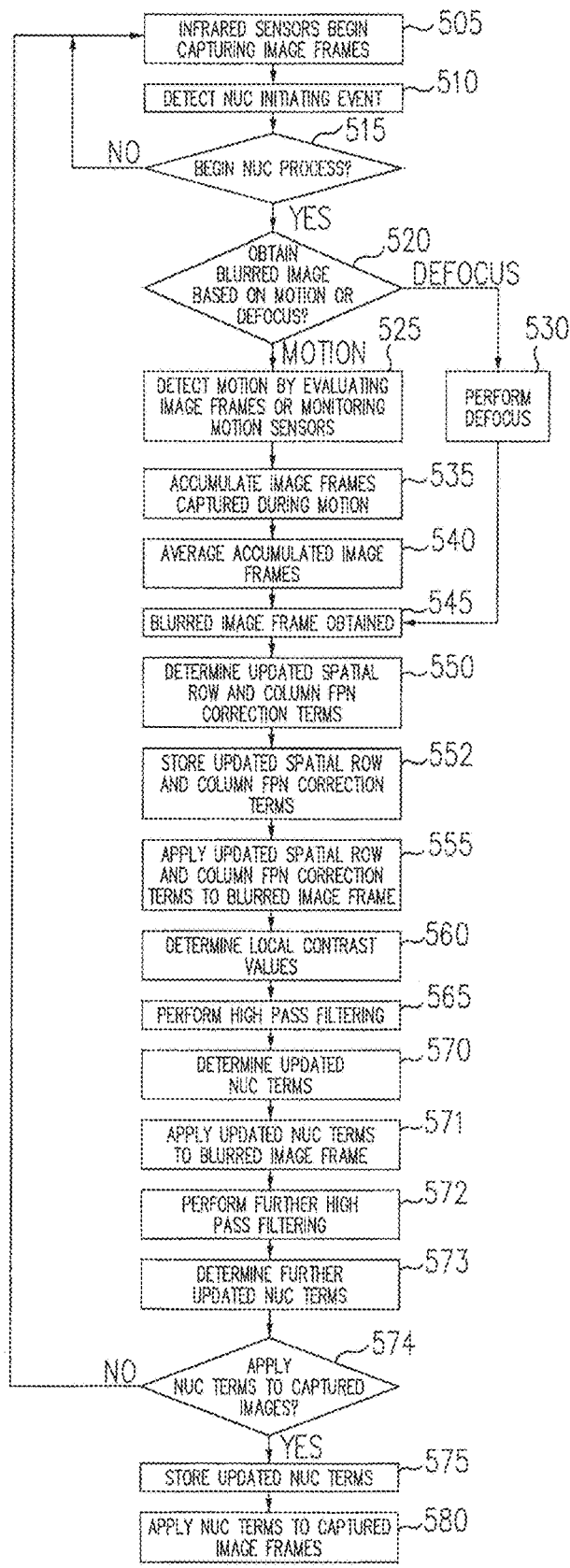
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505:

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
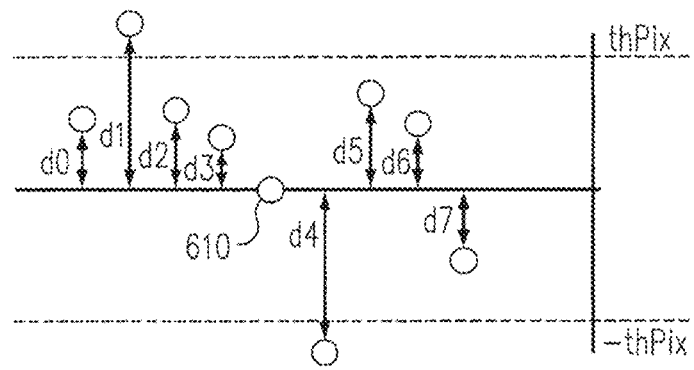
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN teems are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN teens (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
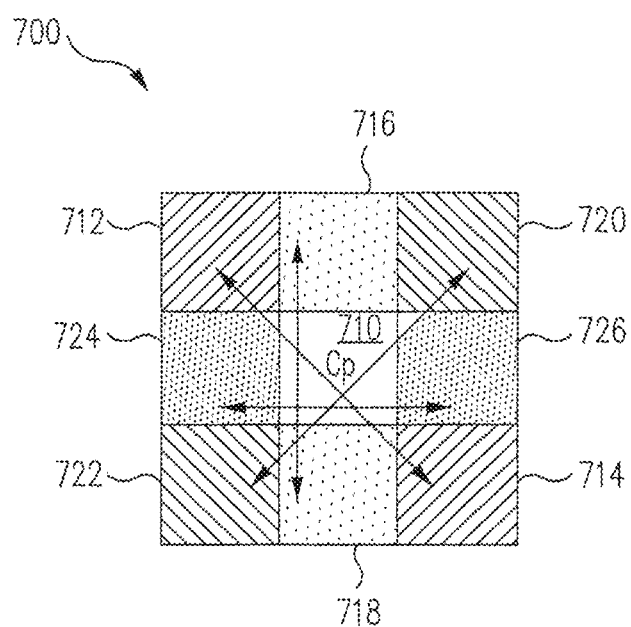
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
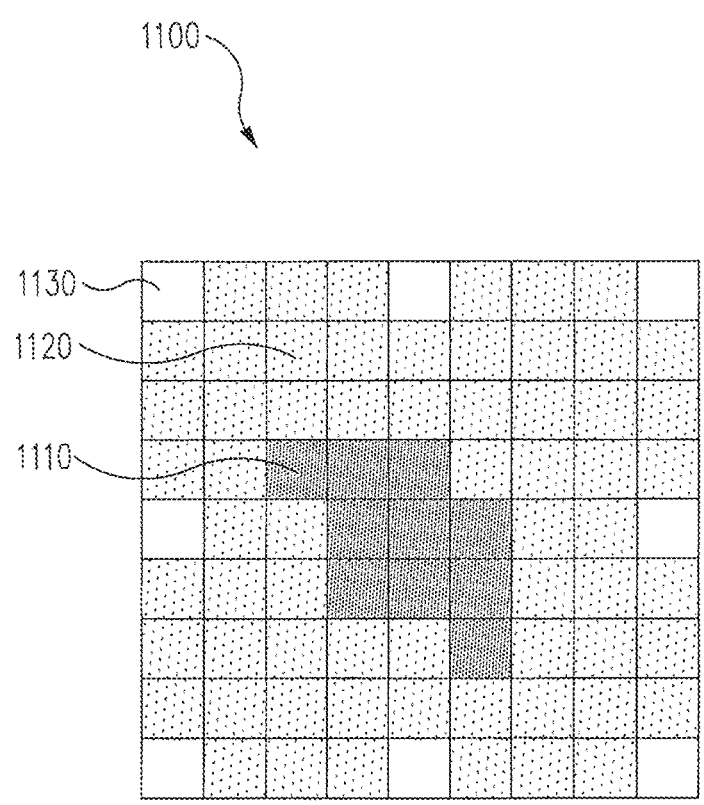
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
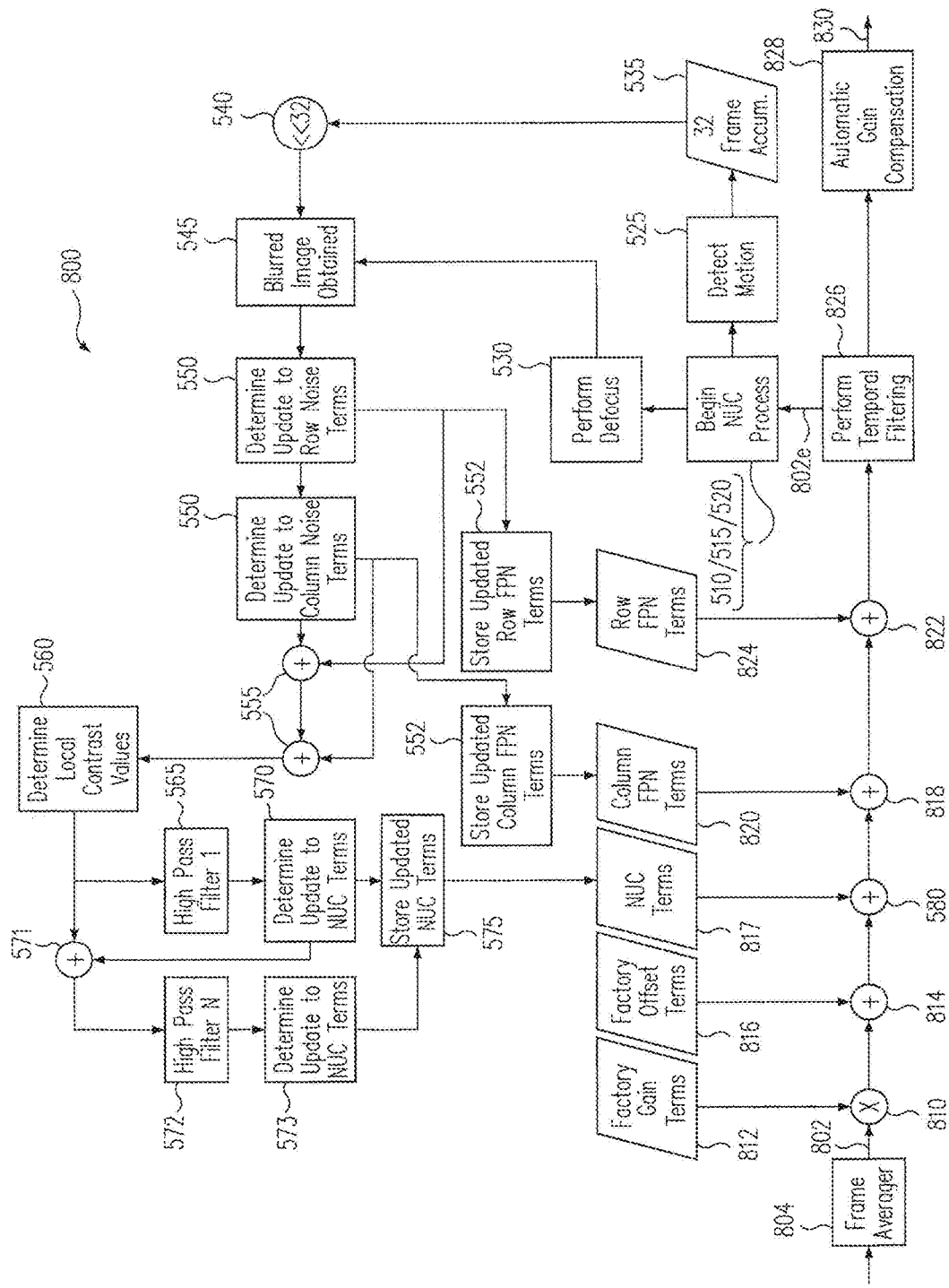
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
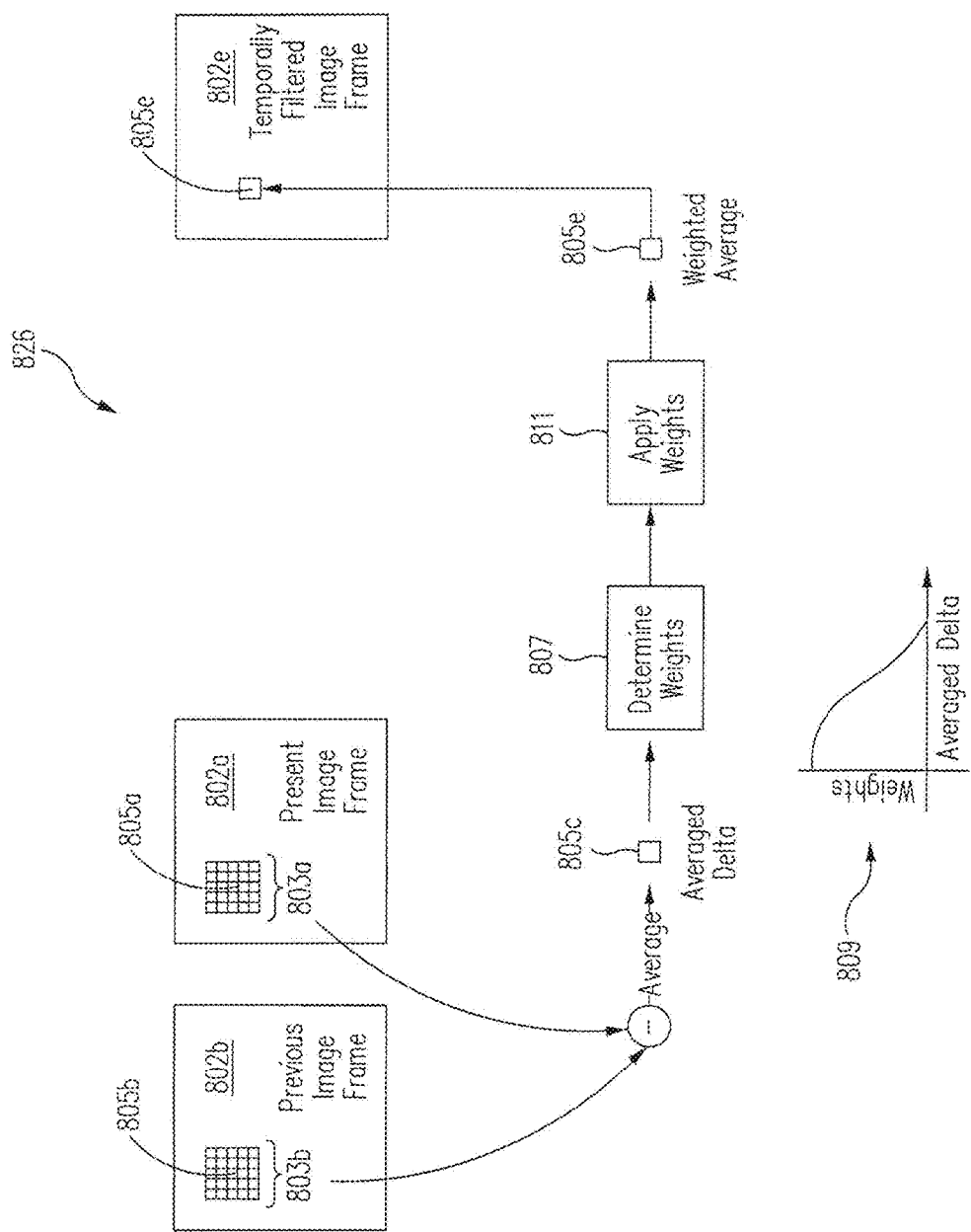
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
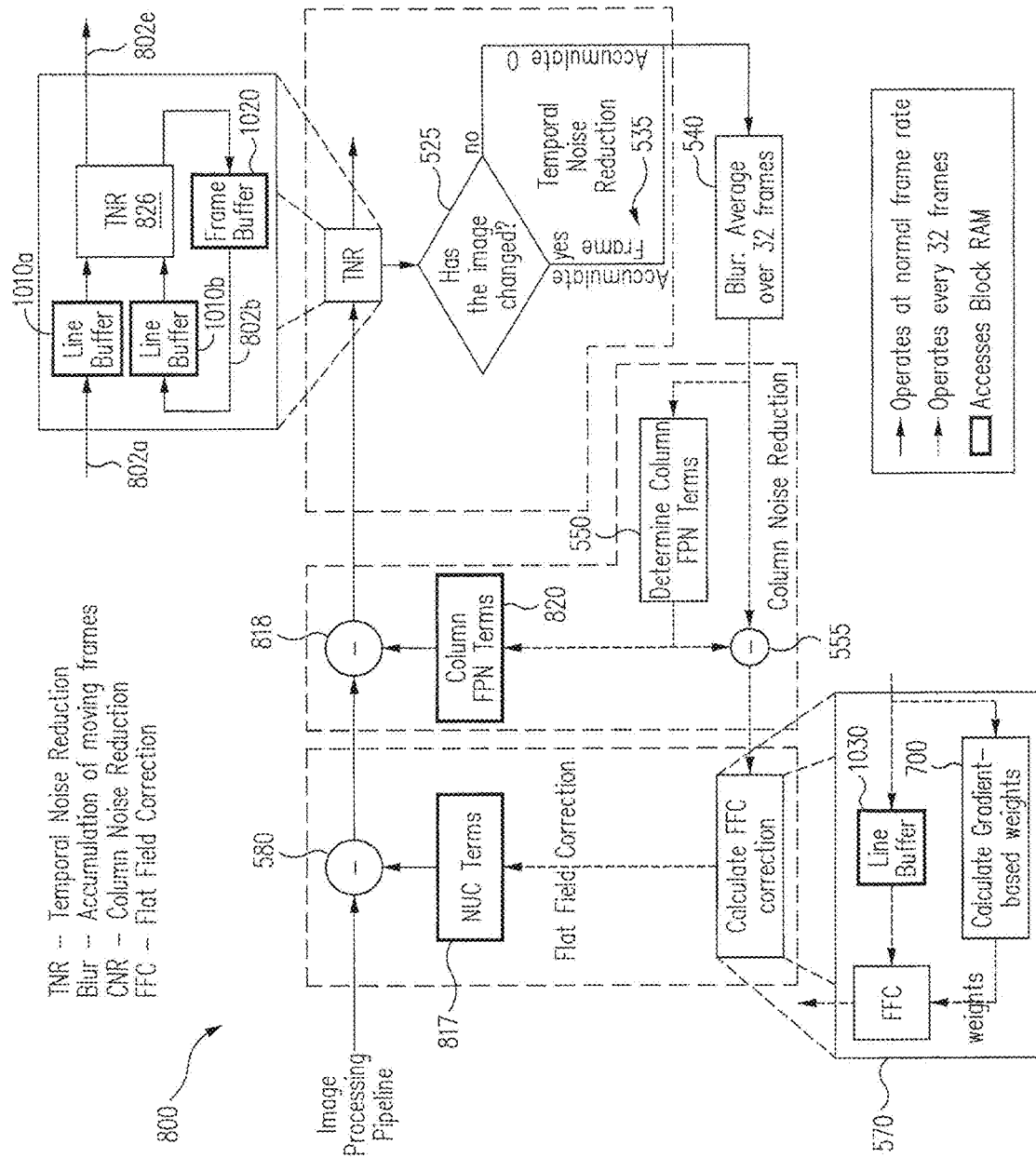
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is $\frac{1}{32}$ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
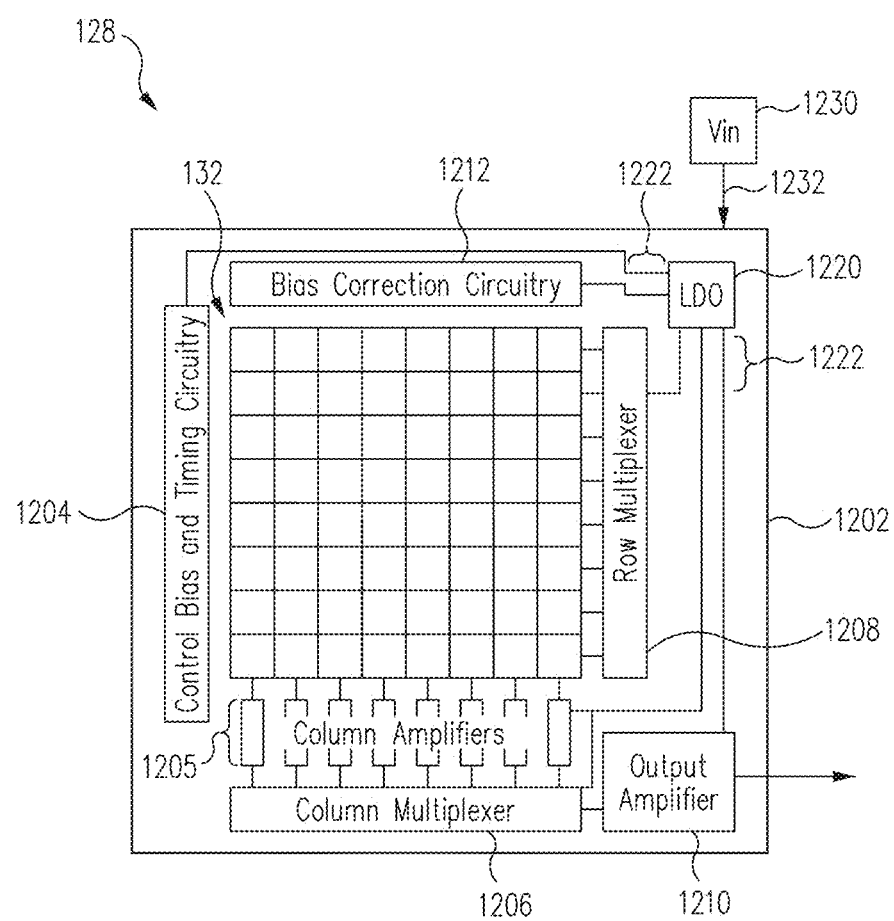
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROIC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.5 volts in one embodiment). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
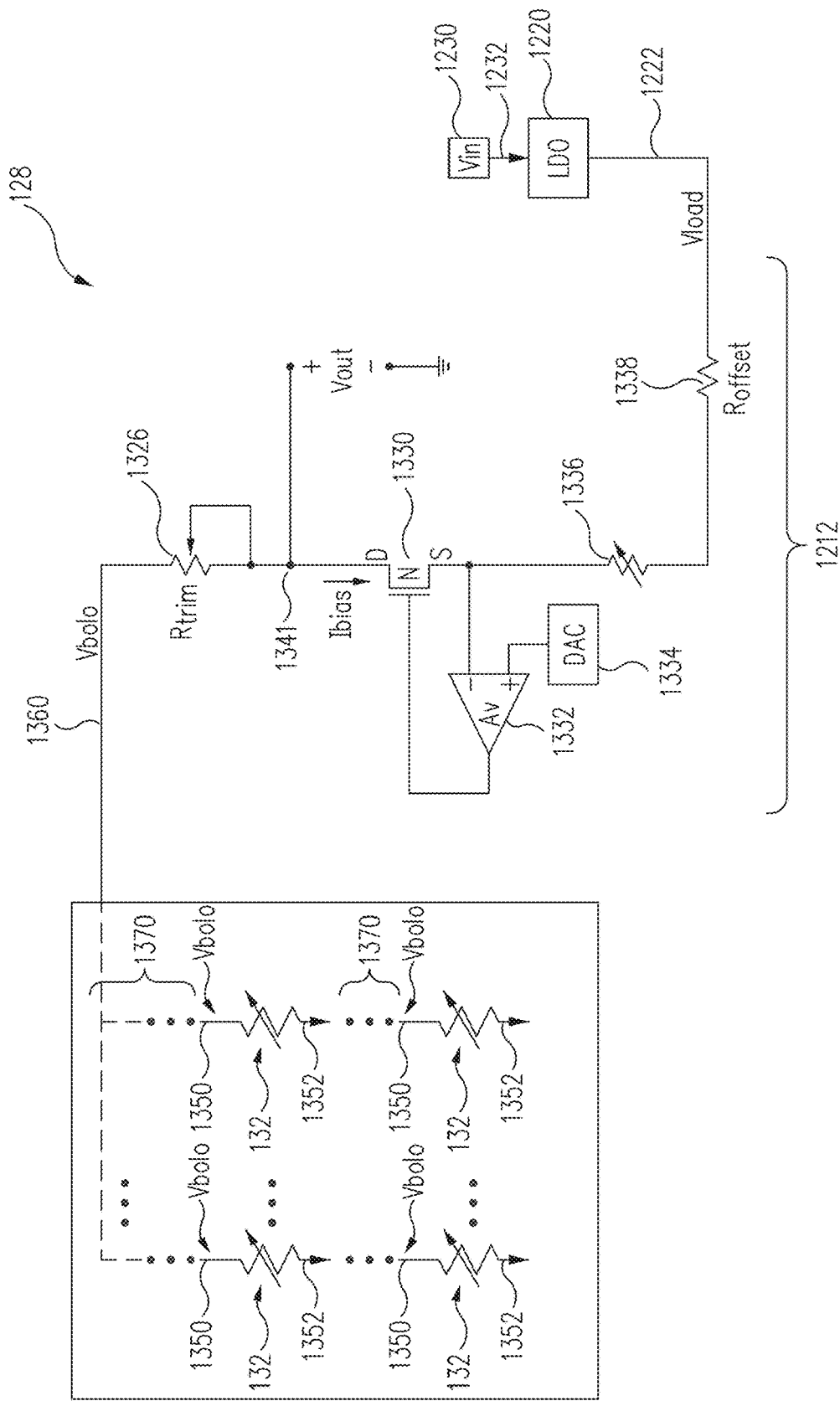
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROIC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manner described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 previously referenced herein.

Figure 14:
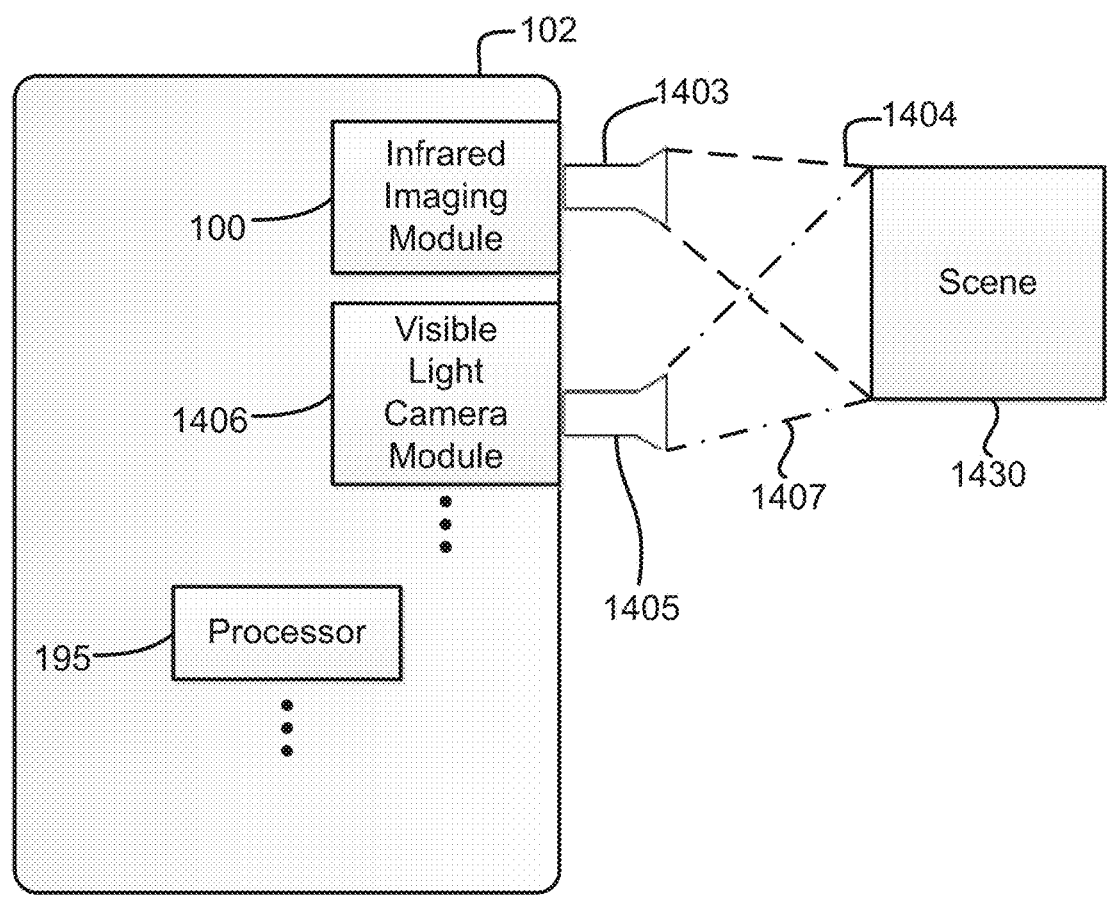
FIG. 14 illustrates a block diagram of a host system having an infrared imaging module and a visible light camera in accordance with an embodiment of the disclosure.

Referring now to FIG. 14, a block diagram is shown of another implementation of host system 102 showing how system 102 may include one or more non-thermal imaging modules such as visible light camera module 1406 in addition to one or more infrared imaging modules such as infrared imaging module 100 in accordance with an embodiment of the disclosure. System 102 may be used to image a real-world scene such as scene 1430 (e.g., a portion of a golf course).

System 102 may include one or more infrared imaging modules 100, one or more visible light cameras 1406, and additional components as described above in connection with FIG. 1 (e.g., processor 195, memory 196, display 197, one or more motion sensors 194, and/or other components 198 such as a control panel, alert components, or communications components). In various embodiments, components of system 102 of FIG. 14 may be implemented in the same or similar manner as corresponding components of host device 102 of FIG. 1. Moreover, components of system 102 may be configured to perform various NUC processes and other processes described herein.

As shown in FIG. 14, in some embodiments, infrared imaging module 100 may include various optical elements 1403 (e.g., one or more infrared-transmissive lens, one or more infrared-transmissive prisms, one or more infrared-reflective mirrors, or one or more infrared fiber optic elements) that guide infrared radiation from scene 1430 to an FPA of infrared imaging module 100. In some embodiments, optical elements 1403 may be used to suitably define or alter FOV 1404 of infrared imaging module 100. A switchable FOV (e.g., selectable by infrared imaging module 100 and/or processor 195) may optionally be provided, which may be useful when, for example, a selective close-up view of a portion of scene 1430 is desired.

Optical elements 1403 may also include one or more filters adapted to pass infrared radiation of some wavelengths but substantially block infrared radiation of other wavelengths (e.g., short-wave infrared (SWIR) filters, mid-wave infrared (MWIR) filters, long-wave infrared (LWIR) filters, and narrow-band filters). Such filters may be utilized to tailor infrared imaging module 100 for increased sensitivity to a desired band of infrared wavelengths. In some embodiments, filters may be selectable (e.g., provided as a selectable filter wheel). In other embodiments, filters may be fixed as appropriate for a desired application of system 102.

Visible light camera 1406 may be a small form factor non-thermal imaging module or imaging device, and may be implemented in a similar manner as various embodiments of infrared imaging module 100 disclosed herein, but with one or more sensors responsive to non-thermal radiation (e.g., radiation in the visible, near infrared, short-wave infrared or other non-thermal portion of the electromagnetic spectrum). For example, in some embodiments, visible light camera 1406 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), or other sensors.

As shown in FIG. 14, in some embodiments, visible light camera module 1406 may include various optical elements 1405 (e.g., one or more lenses, one or more color filters, one or more prisms, one or more mirrors, or one or more fiber optic elements) that guide non-thermal radiation from scene 1430 to visible light camera module 1406. In some embodiments, optical elements 1405 may be used to suitably define or alter FOV 1407 of visible light camera module 1406. A switchable FOV (e.g., selectable by visible light camera module 1406 and/or processor 195) may optionally be provided, which may be useful when, for example, a selective close-up view of a portion of scene 1430 is desired. If desired, elements 1403 and 1405 may be operable to alternately switch between an infrared imaging mode and a visible light imaging mode for system 102.

Optical elements 1405 may also include one or more filters adapted to pass radiation of some wavelengths (colors) but substantially block radiation of other wavelengths (e.g., red color filters, blue color filters, green color filters, near-infrared color filters, short-wave infrared filters, and narrow-band filters). In some embodiments, filters of elements 1405 may be selectable (e.g., provided as a selectable filter wheel). In other embodiments, filters of element 1405 may be fixed as appropriate for a desired application of system 102. Although camera module 1406 is sometimes referred to herein as a visible light camera module as an example, it should be appreciated that camera module 1406 may be any suitable non-thermal camera module as described herein that generates images in response to incoming light having any suitable corresponding range of non-thermal wavelengths (e.g., visible light wavelengths, near infrared wavelengths, short-wave infrared wavelengths or other wavelengths that are relatively shorter than thermal infrared wavelengths).

In some embodiments, non-thermal images such as visible light images captured by visible light camera 1406 may be received by processor 195, which may be configured to fuse, superimpose, or otherwise combine the visible light images with the thermal images captured by infrared imaging module 100 as further described herein.

In some embodiments, visible light camera 1406 may be co-located with infrared imaging module 100 in a housing structure and oriented so that FOV 1407 of visible light camera 1406 at least partially overlaps FOV 1404 of infrared imaging module 100. In one example, infrared imaging module 100 and visible light camera 1406 may be implemented as a dual sensor module sharing a common substrate according to various techniques described in U.S. Provisional Patent Application No. 61/748,018 previously referenced herein. Such a dual sensor module implementation may include common circuitry and/or common restraint devices for infrared imaging and visible light imaging, thereby potentially reducing an overall size of system 102 as compared to embodiments where infrared imaging module 100 and visible light camera 1406 are implemented as individual modules. Additionally, the dual sensor module implementation may be adapted to reduce a parallax error between images captured by infrared imaging module 100 and visible light camera 1406 by reducing the distance between them.

Infrared images captured, processed, and/or otherwise managed by infrared imaging module 100 may be radiometrically normalized infrared images (e.g., thermal images). That is, pixels that make up the captured image may contain calibrated thermal data (e.g., temperature data). As discussed above in connection with FIG. 1, infrared imaging module 100 and/or associated components may be calibrated using appropriate techniques so that images captured by infrared imaging module 100 are properly calibrated thermal images. In some embodiments, appropriate calibration processes may be performed periodically by infrared imaging module 100 and/or processor 195 so that infrared imaging module 100, and hence the thermal images captured by it, may maintain proper calibration.

Radiometric normalization permits infrared imaging module 100 and/or processor 195 to efficiently detect, from thermal images, objects having a specific range of temperature. Infrared imaging module 100 and/or processor 195 may detect such objects efficiently and effectively, because thermal images of objects having a specific temperature may be easily discernible from a background and other objects, and yet less susceptible to lighting conditions or obscuring (e.g., obscured by trees or other foliage). For example, a flagstick having a thermal target at a known temperature may be efficiently and effectively detected using radiometrically normalized thermal images.

Figure 15:
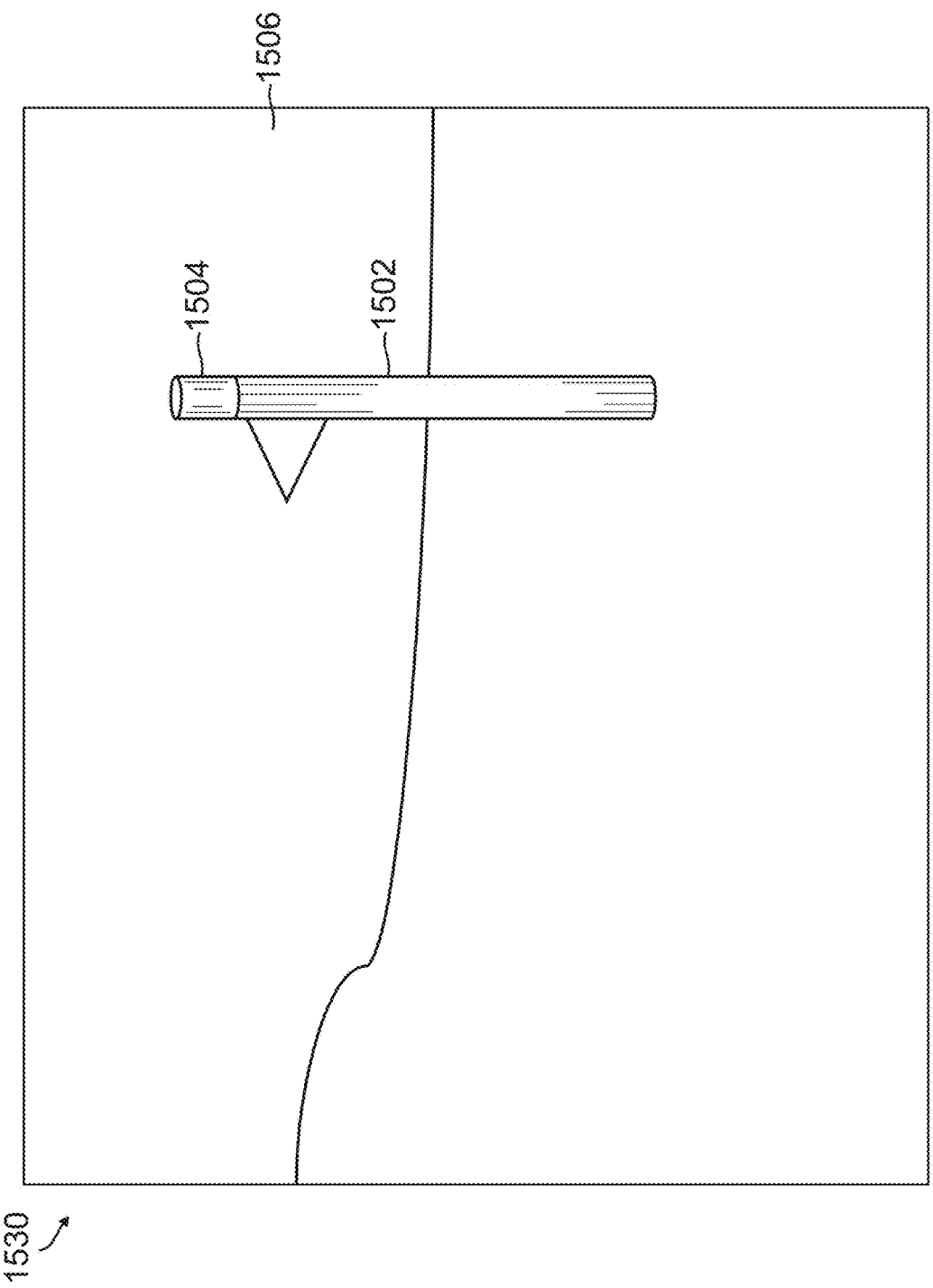
FIG. 15 illustrates an example thermal image that may be captured using an infrared imaging module and analyzed by a processor in accordance with an embodiment of the disclosure.

Also referring to FIG. 15, an example thermal image 1530 (shown as a user-viewable thermal image for ease of understanding) that may be captured by infrared imaging module 100 is shown. As this example thermal image 1530 shows, a flagstick 1502 on a golf course may include a thermal target 1504 that exhibits a different temperature (e.g., a higher temperature or a lower temperature) than the rest of flagstick 1502 and a background such as golf course 1506. Furthermore, thermal target 1504 may exhibit a relatively fixed temperature or temperatures within a certain range (e.g., a known temperature) that can be differentiated in a thermal image such as thermal image 1530. Thus, thermal target 1504 that is detected in a thermal image such as image 1530 may be accurately and yet efficiently differentiated and tracked using appropriate detection and tracking operations described herein and elsewhere.

Thermal target 1504 may be heated or cooled to control the temperature of thermal target 1504 to enhance detectability of the target in thermal images. For example, thermal target 1504 may include an internal power source and a heater (not shown) that heats the thermal target (e.g., to a desired temperature) relative to other portions of flagstick 1502 and golf course 1506. In another example, thermal target 1504 may include a power source and a cooler or other heat sink (not shown) that reduces the temperature of thermal target 1504 (e.g., to a desired temperature) relative to other portions of flagstick 1502 and golf course 1506. In other embodiments, thermal target 1504 may be formed of absorbent or reflective materials that efficiently absorb sunlight to heat the thermal target or prevent absorption of sunlight to keep the target relatively cool (as examples).

In some embodiments, if visible light images captured by visible light camera 1406 are available, processor 195 may be configured to track features of a scene such as thermal target 1504 of flagstick 1502 based additionally or alternatively on the visible light images. For example, the visible light images may provide more detail and contrast than the thermal images in certain ambient light conditions, and thus may be analyzed using suitable tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be analyzed to track the features of the scene. If processor 195 is configured to detect and track the features of a scene using the visible light images, processor 195 may be further configured to convert pixel coordinates of the tracked features in the visible light images to corresponding pixel coordinates in the thermal images.

In some embodiments, thermal images from one or more infrared imaging modules such as infrared imaging module 100 and non-thermal images from one or more non-thermal camera modules such as visible light camera module 1406 may be fused or combined to generate images having a higher definition, contrast, and/or detail.

The fusing or combining operations in accordance with one or more embodiments may be described in further detail with reference to FIG. 16, which is a flowchart of a process 1600 to combine or fuse the thermal images and the non-thermal (e.g., visible light) images. The combined images may include radiometric data and/or other infrared characteristics corresponding to scene 1430, but with significantly more object detail (e.g., contour or edge detail) and/or contrast than typically provided by the thermal or non-thermal images alone. Thus, for example, the combined images generated in these examples may beneficially provide sufficient radiometric data, detail, and contrast to allow easier recognition and/or interpretation of the presence, location, position, or other features of objects such as flagsticks and/or thermal targets of flagsticks in scene 1430, such as a golf course.

Figure 16:
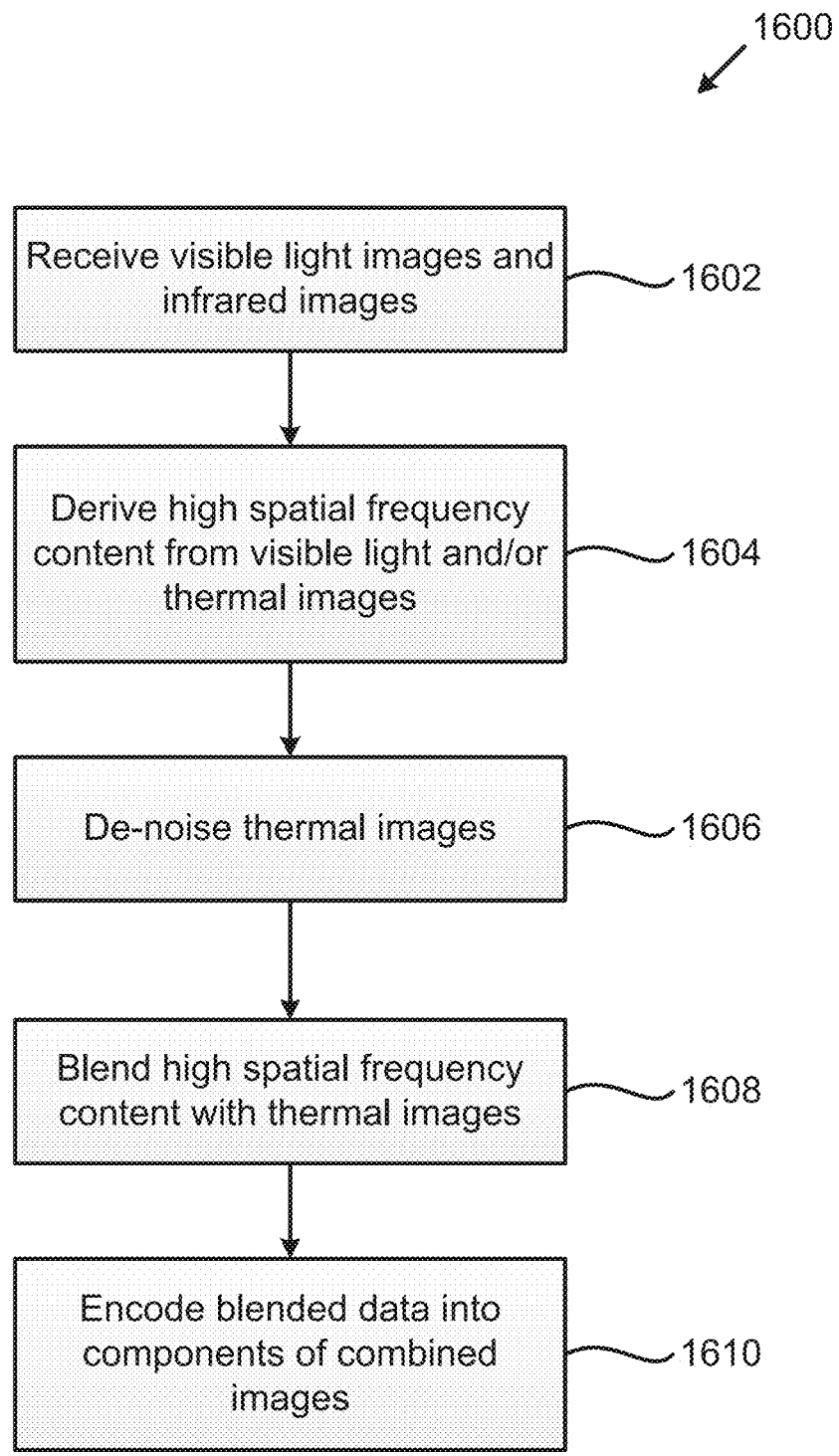
FIG. 16 illustrates a process for combining thermal images and visible light images in accordance with an embodiment of the disclosure.

Although the process described herein in connection with FIG. 16 discusses fusing or combining thermal images with visible light images as an example, it should be appreciated that the process may be applied to combining thermal images with any suitable non-thermal images (e.g., visible light images, near infrared images, short-wave infrared images, EMCCD images, ICCD images, or other non-thermal images).

At block 1602, visible light images and infrared images such as thermal images may be received. For example, visible light images of scene 1430 may be captured by visible light camera 1406 and the captured visible light images may be received by processor 195. Processor 195 may perform various operations of process 1600 using both thermal images and non-thermal images, for example.

At block 1604, high spatial frequency content from one or more of the visible light and thermal images may be derived from one or more of the visible light and thermal images received in block 1602. High spatial frequency content derived according to various embodiments may include edge/contour details and/or high contrast pixels extracted from the one or more of the visible light and thermal images, for example.

In one embodiment, high spatial frequency content may be derived from the received images by performing a high pass filter (e.g., a spatial filter) operation on the images, where the result of the high pass filter operation is the high spatial frequency content. In an alternative embodiment, high spatial frequency content may be derived from the received images by performing a low pass filter operation on the images, and then subtracting the result from the original images to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements 1403 of infrared imaging module 100 and/or optical elements 1405 of visible light camera 1406 may be configured to introduce vibration, de-focusing, and/or movement artifacts into a series of images captured by one or both of infrared imaging module 100 and visible light camera 1406. High spatial frequency content may be derived from subtractions of images such as adjacent images in the series.

In some embodiments, high spatial frequency content may be derived from only the visible light images or the thermal images. In other embodiments, high spatial frequency content may be derived from only a single visible light or thermal image. In further embodiments, high spatial frequency content may be derived from one or more components of the visible light and/or thermal images, such as a luminance component of visible light images, for example, or a radiometric component of thermal images. Resulting high spatial frequency content may be stored temporarily (e.g., in memory 196) and/or may be further processed according to block 1608.

At block 1606, one or more thermal images may be de-noised. For example, processor 195 may be configured to de-noise, smooth, or blur one or more thermal images of scene 1430 using a variety of image processing operations. In one embodiment, removing high spatial frequency noise from the thermal images allows the processed thermal images to be combined with high spatial frequency content derived according to block 1604 with significantly less risk of introducing double edges (e.g., edge noise) to objects depicted in combined images of scene 1430.

In one embodiment, removing noise from the thermal mages may include performing a low pass filter (e.g., a spatial and/or temporal filter) operation on the images, where the result of the low pass filter operation is de-noised or processed thermal images. In a further embodiment, removing noise from one or more thermal images may include down-sampling the thermal images and then up-sampling the images back to the original resolution.

In another embodiment, processed thermal images may be derived by actively blurring thermal images of scene 1430. For example, optical elements 1403 may be configured to slightly de-focus one or more thermal images captured by infrared imaging module 100. The resulting intentionally blurred thermal images may be sufficiently de-noised or blurred so as to reduce or eliminate a risk of introducing double edges into combined images of scene 1430, as further described below. In other embodiments, blurring or smoothing image processing operations may be performed by processor 195 on the received thermal images as an alternative or supplement to using optical elements 1403 to actively blur thermal images of scene 1430. Resulting processed thermal images may be stored temporarily (e.g., in memory 196) and/or may be further processed according to block 1608.

At block 1608, high spatial frequency content may be blended with one or more thermal images. For example, processor 195 may be configured to blend high spatial frequency content derived in block 1604 with one or more thermal images of scene 1430, such as the processed thermal images provided in block 1606.

In one embodiment, high spatial frequency content may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of scene 1430, but may not exist within the interior of such objects. In such embodiments, blended image data may simply include the high spatial frequency content, which may subsequently be encoded into one or more components of combined images, as described in block 1610.

For example, a radiometric component of thermal images may be a chrominance component of the thermal images, and the high spatial frequency content may be derived from the luminance and/or chrominance components of visible light images. In this embodiment, combined images may include the radiometric component (e.g., the chrominance component of the thermal images) encoded into a chrominance component of the combined images and the high spatial frequency content directly encoded (e.g., as blended image data but with no thermal image contribution) into a luminance component of the combined images. By doing so, a radiometric calibration of the radiometric component of the thermal images may be retained. In similar embodiments, blended image data may include the high spatial frequency content added to a luminance component of the thermal images, and the resulting blended data encoded into a luminance component of resulting combined images.

In other embodiments, high spatial frequency content may be derived from one or more particular components of one or a series of visible light and/or thermal images, and the high spatial frequency content may be encoded into corresponding one or more components of combined images. For example, the high spatial frequency content may be derived from a luminance component of visible spectrum images, and the high spatial frequency content, which in this embodiment is all luminance image data, may be encoded into a luminance component of combined images.

In another embodiment, high spatial frequency content may be blended with thermal images using a blending parameter and an arithmetic equation. For example, in one embodiment, the high spatial frequency content may be derived from a luminance component of visible light images. In such an embodiment, the high spatial frequency content may be blended with a corresponding luminance component of thermal image according to a blending parameter and a blending equation to produce blended image data. The blended image data may be encoded into a luminance component of combined images, for example, and the chrominance component of the thermal images may be encoded into the chrominance component of the combined images. In embodiments where the radiometric component of the infrared images may be their chrominance component, the combined images may retain a radiometric calibration of the thermal images. In other embodiments, portions of the radiometric component may be blended with the high spatial frequency content and then encoded into combined images.

More generally, the high spatial frequency content may be derived from one or more components of visible light images and/or thermal image. In such an embodiment, the high spatial frequency content may be blended with one or more components of the thermal images to produce blended image data (e.g., using a blending parameter and a blending equation), and resulting combined images may include the blended image data encoded into corresponding one or more components of the combined images. In some embodiments, the one or more components of the blended data do not have to correspond to the eventual one or more components of the combined images (e.g., a color space/format conversion may be performed as part of an encoding process).

A blending parameter value may be selected by a user or may be automatically determined by processor 195 according to context or other data, for example, or according to an image enhancement level expected by system 102. In some embodiments, the blending parameter may be adjusted or refined while combined images are being displayed (e.g., by display 197). In some embodiments, a blending parameter may be selected such that blended image data includes only thermal characteristics, or, alternatively, only visible light characteristics. A blending parameter may also be limited in range, for example, so as not to produce blended data that is out-of-bounds with respect to a dynamic range of a particular color space/format or a display.

In addition to or as an alternative to the processing described above, processing according to the high contrast mode may include one or more processing steps, ordering of processing steps, arithmetic combinations, and/or adjustments to blending parameters as disclosed in U.S. patent application Ser. No. 13/437,645 previously referenced herein. For example, the following equations may be used to determine the components Y, Cr and Cb for the combined images with the Y component from the high pass filtered visible light images and the Cr and Cb components from the thermal images.

$$hp\_y\_vis = highpass(y\_vis)$$

$$(y\_ir, cr\_ir, cb\_ir) = colored(lowpass(ir\_signal\_linear))$$

In the above equations, highpass(y_vis) may be high spatial frequency content derived from high pass filtering a luminance component of visible light images. Colored(lowpass(ir_signal_linear)) may be the resulting luminance and chrominance components of the thermal images after the thermal images are low pass filtered. In some embodiments, the thermal images may include a luminance component that is selected to be 0.5 times a maximum luminance (e.g., of a display and/or a processing step). In related embodiments, the radiometric component of the thermal images may be the chrominance component of the thermal images. In some embodiments, the y_ir component of the thermal images may be dropped and the components of the combined images may be (hp_y_vis, cr_ir, cb_ir), using the notation above.

In another embodiment, the following equations may be used to determine the components Y, Cr and Cb for combined images with the Y component from the high pass filtered visible light images and the Cr and Cb components from the thermal images.

$$comb\_y = y\_ir + alpha \times hp\_y\_vis$$

$$comb\_cr = cr\_ir$$

$$comb\_cb = cb\_ir$$

The variation of alpha thus gives the user an opportunity to decide how much contrast is needed in the combined images. With an alpha of close to zero, the thermal images alone will be shown, but with a very high alpha, very sharp contours/edges can be seen in the combined images. Theoretically, alpha can be an infinitely large number, but in practice a limitation will probably be necessary, to limit the size of alpha that can be chosen to what will be convenient in the current application.

Once the high spatial frequency content is blended with one or more thermal images, processing may proceed to block 1610, where blended data may be encoded into components of the combined images in order to form the combined images.

At block 1610, the blended data may be encoded into one or more components of the combined images. For example, processor 195 may be configured to encode blended data derived or produced in accordance with block 1608 into combined images that increases, refines, or otherwise enhances the information conveyed by either the visible light or thermal images viewed by themselves. In some embodiments, encoding blended image data into a component of combined images may include additional image processing operations, for example, such as dynamic range adjustment, normalization, gain and offset operations, noise reduction, and color space conversions, for instance.

In addition, processor 195 may be configured to encode other image data into combined images. For example, if blended image data is encoded into a luminance component of combined images, a chrominance component of either visible light images or thermal images may be encoded into a chrominance component of combined images. Selection of source images may be made through user input, for example, or may be determined automatically based on context or other data. More generally, in some embodiments, a component of combined images that is not encoded with blended data may be encoded with a corresponding component of visible light images or thermal images. By doing so, a radiometric calibration of thermal images and/or a color space calibration of visible light images may be retained in the resulting combined images.

In some embodiments, at least some part or some functionalities of processor 195 described herein may be implemented as part of infrared imaging modules 100, for example, at processing module 160 described above in connection with FIG. 3. In some embodiments, at least some part or some functionalities of processor 195 may be part of or implemented with other existing processors of an external device such as a mobile phone, a tablet device, a mobile handset, a laptop computer, a desktop computer, an automobile information display system, or any other devices that may be used to present monitoring information from a monitoring system. In other embodiments, processor 195 may interface and communicate with such other external processors and components associated with such processors.

Figure 17:
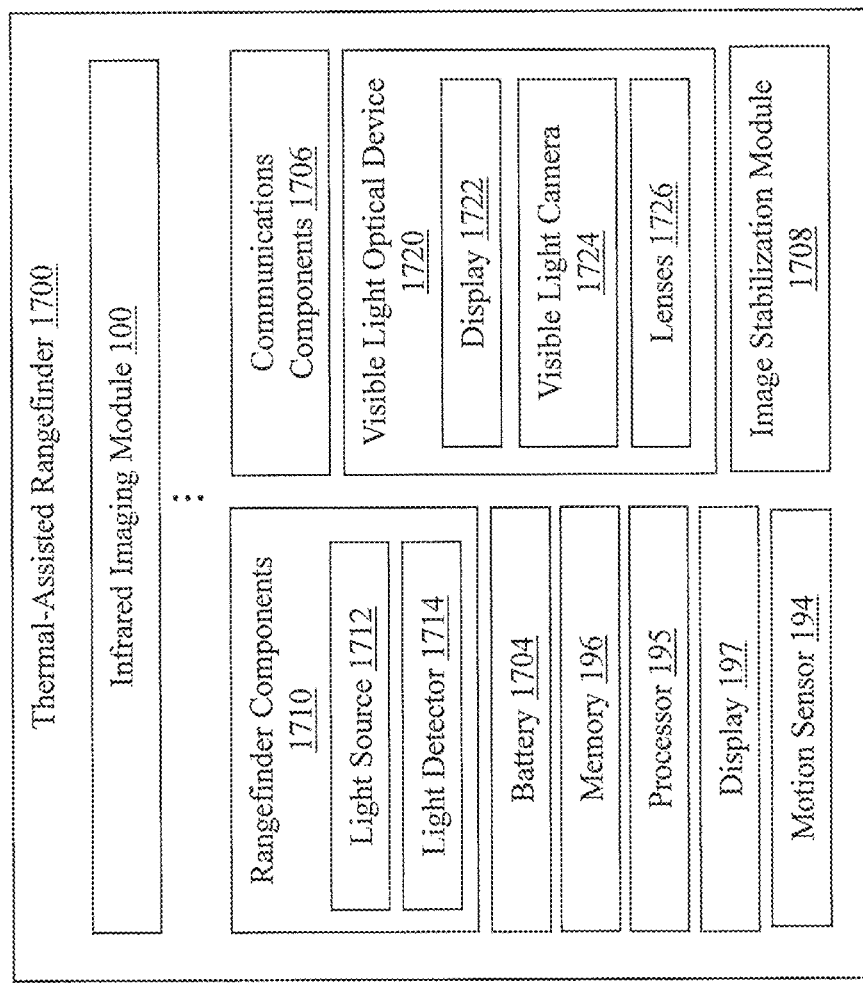
FIG. 17 illustrates a block diagram of a host device implemented as a thermal-assisted rangefinder including an infrared imaging module in accordance with an embodiment of the disclosure.

In one suitable configuration that is sometimes discussed herein as an example, system 102 may be implemented as a rangefinder such as thermal-assisted rangefinder 1700 of FIG. 17. As shown in FIG. 17, thermal-assisted rangefinder 1700 may include one or more infrared imaging modules 100 and one or more rangefinder components such as rangefinder components 1710. The one or more infrared imaging modules 100 may each have a field of view (FOV) that covers a portion of a scene such as scene 1430 of FIG. 14 (e.g., a golf course). The one or more rangefinder components 1710 may include a light source and a light detector or receiver. For example, rangefinder components 1701 may include a laser and a laser detector (e.g., a sensor configured to detect reflected portions of laser light emitted by the laser.

As shown in FIG. 17, thermal-assisted rangefinder 1700 may include one or more batteries such as battery 1704, memory such as memory 196, one or more processors such as processor 195, one or more displays 197, one or more motion sensors 194, wired or wireless communications components such as communications components 1706, one or more visible light optical devices 1720, and one or more image stabilization modules 1708.

Battery 1704 may be a lithium ion battery, a lithium polymer battery, a nickel cadmium battery, a nickel metal hydride battery, or other suitable type of battery technology for a portable wearable imaging device. Device 1700 may include one, two, three, or more than three batteries or, if desired, device 1700 may be powered by an external battery or battery pack (e.g., through a wired connection to a battery in a backpack or other portable vessel).

Memory 196 may include one or more memory devices to store data and information, including thermal images and monitoring information. The one or more memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, and/or a disk drive. In one embodiment, thermal images and monitoring information stored in the one or more memory devices may be retrieved later for purposes of reviewing and/or further diagnosing the conditions of the environment monitored by device 1700. In various embodiments, processor 195 may be configured to execute software instructions stored on memory 196 to perform various methods, processes, or operations in the manner described herein.

Display 197 may be configured to present, indicate, or otherwise convey information generated by processor 195, infrared imaging modules 100, and/or visible light cameras 1406. Display 197 may be included in visible light optical device 1720 as display 1722, or may be a separate display. In various embodiments, display 197 may be implemented with an electronic display screen, such as a liquid crystal display (LCD), a cathode ray tube (CRT), light-emitting-diode (LED) or various other types of generally known video displays and monitors. Display 197 according to such embodiments may be suitable for presenting user-viewable thermal images converted by processor 195 from thermal images captured by infrared imaging modules 100.

In some embodiments, existing display screens on external devices such as mobile phones, tablet devices, laptop computers, desktop computers, automobile information display systems, or any other devices may receive the thermal images and/or the rangefinder information from thermal-assisted rangefinder 1700 to present the rangefinder information to a user.

In this regard, communications components 1706 may be configured to handle, manage, or otherwise facilitate wired and/or wireless communication between various components of thermal-assisted rangefinder 1700 and between thermal-assisted rangefinder 1700 and an external device. For example, thermal-assisted rangefinder 1700 may transmit and receive data to and from an external device, which may receive and further process raw/processed thermal images and/or monitoring information for presentation to a user, through communications components 1706 configured to manage wired and/or wireless connections.

In various embodiments, communications components 1706 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 1706 may also be configured for a proprietary wireless communication protocol and interface based on radio frequency (RF), microwave frequency (MWF), infrared frequency (IRF), and/or other appropriate wireless transmission technologies. Communications components 1706 may include an antenna coupled thereto for wireless communication purposes. Thus, in one example, communications components 1706 may handle, manage, or otherwise facilitate wireless communication by establishing wireless link to a wireless router, hub, or other appropriate wireless networking devices.

In various embodiments, communications components 1706 may be configured to interface with a wired network via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communication module 1706. Communications components 1706 may be configured to communicate over a wired link (e.g., through a network router, switch, hub, or other network devices) for wired communication purposes. For example, a wired link may be implemented with a power-line cable, a coaxial cable, a fiber-optics cable, or other appropriate cables or wires that support corresponding wired network technologies.

In some embodiments, thermal-assisted rangefinder 1700 may include as many such communication components 1706 as desired for various applications of thermal-assisted rangefinder 1700 to suit various types of monitoring environments. In other embodiments, communication components 1706 may be integrated into or implemented as part of various other components of thermal-assisted rangefinder 1700. For example, infrared imaging module 100, processor 195, and display 197 may each include a subcomponent that may be configured to perform the operations of communications components 1706, and may communicate via wired and/or wireless connection without separate components 1706.

Motion sensors 194 may be monitored by and provide information to infrared imaging modules 100 and/or processor 195 for performing various NUC techniques described herein or to perform image stabilization of images captured by infrared imaging module and/or visible light camera 1724.

In various embodiments, one or more components of thermal-assisted rangefinder 1700 may be combined and/or implemented or not, as desired or depending on application requirements. For example, processor 195 may be combined with infrared imaging modules 100, memory 196, and/or communications components 1706. In another example, processor 195 may be combined with infrared imaging modules 100 with only certain operations of processor 195 performed by circuitry (e.g., processor, logic device, microprocessor, microcontroller, etc.) within infrared imaging modules 100.

If desired, thermal-assisted rangefinder 1700 may include one or more visible light optical devices 1720. Visible light optical device 1720 may include one or more optical lenses 1726 configured to magnify a scene, such as a golf course, for viewing by a user. For example, the one or more optical lenses 1726 may be a telescope. Visible light optical device 1702 may include a visible light camera 1724 (e.g., an implementation of visible light camera 1406 of FIG. 14), and a display 1722. Visible light camera 1724 may be configured to capture a visible light image of the scene and to present the visible light image or a magnified visible light image on display 1722. In this way, when a user is at a golf course and the user is trying to point light source 1712 at a flagstick, visible light optical device 1720 allows the user to view a magnified version of the golf course. The magnified view of the golf course may be presented directly to the user's eye through the optical components or may be an image of the magnified view presented on the display. The display may be used to supplement the magnified view of the golf course with alignment guide information using the display.

In certain embodiments, thermal-assisted rangefinder 1700 may be configured to stabilize the infrared image captured by infrared imaging module 100 and/or the visible light image captured by visible light camera 1724. In an example, thermal-assisted rangefinder 1700 may include an optical image stabilization module 1708, such as a lens-based optical image stabilizer or a sensor-shift optical image stabilizer, configured to perform image stabilization. In another example, thermal-assisted rangefinder 1700 (e.g., processor 195) may be configured to perform digital image stabilization on captured images. Thermal-assisted rangefinder 1700 may be configured to implement other image stabilization techniques.

Infrared imaging module 100 of thermal-assisted rangefinder 1700 may be configured to capture, process, and/or otherwise manage infrared images (e.g., including thermal images) of a scene, such as a golf course. In this regard, infrared imaging module 100 may be attached, mounted, installed, or otherwise disposed at any suitable location on or within device 1700 that allows at least a portion of the scene to be placed within field of view (FOV) 1404 of infrared imaging module 100.

Figure 18:
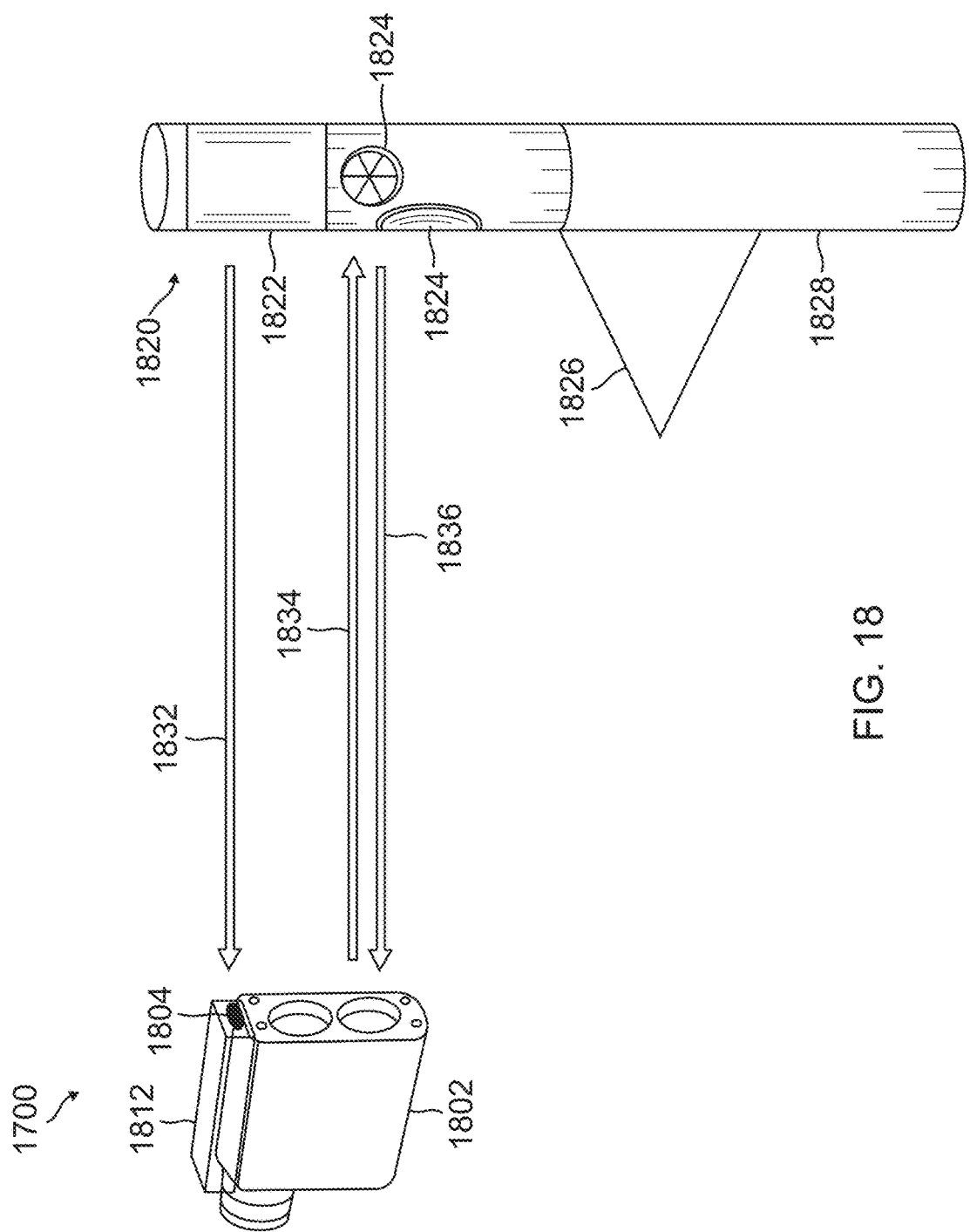
FIG. 18 illustrates an exemplary rangefinder system that includes a thermal-assisted rangefinder and a flagstick with a thermal target in accordance with an embodiment of the disclosure.

Referring now to FIG. 18, an exemplary rangefinder system may include a thermal-assisted rangefinder such as thermal-assisted rangefinder 1700 and a flagstick with a thermal target such as flagstick 1820. In various embodiments, thermal-assisted rangefinder 1700 includes imaging module 1804 mounted on rangefinder 1802. Imaging module 1804 may include an infrared imaging module 100, a visible light camera 1406, an infrared imaging module 100 and a visible light camera 1406, more than one infrared imaging module 100, more than one visible light camera 1406 or any other suitable combination of individual imaging components.

Thermal-assisted rangefinder 1700 may include imaging module 1804 in a housing such as housing 1812. In some embodiments, housing 1812 may include clamps, clips, suction cups, rails, or other suitable attachment mechanisms to releasably attach housing 1812, and hence imaging components (e.g., infrared imaging modules 100), to a suitable rangefinder such as rangefinder 1802. In this manner, imaging module 1804 including infrared imaging module 100 may be configured as an add-on device that is configured to attach to rangefinder 1802 to provide added functionality, i.e. thermal assistance. In some embodiments, housing 1812 may be fixedly attached to a mounting structure with an appropriate fastener. However, these examples are merely illustrative. In other embodiments, one or more imaging modules and associated optical elements and/or circuitry may be formed in a common housing with rangefinder components to form an integrated thermally assisted rangefinder device in which theimal imaging and rangefinding operations are cooperatively performed by the device as described herein. Additional components such as processor 195, communications components 1706, and memory 196 may be located within housing 1812, within a housing of rangefinder 1802, or within other portions of rangefinder 1802.

Thermal-assisted rangefinder 1700 may further include light source 1712 configured to emit light 1834 (e.g., a light beam, such as a laser beam) and light detector 1714 configured to detect incoming light 1836. Incoming light 1836 may be a part of light 1834 reflected from a flagstick, such as flagstick 1820.

In various embodiments, a flagstick such as flagstick 1820 includes a thermal source such as thermal target 1822, a flag 1826, and a support structure such as stick 1828. Flagstick 1820 may also include retroreflectors 1824. Thermal target 1822 may assist thermal-assisted rangefinder 1700 in determining a distance from thermal-assisted rangefinder 1700 to flagstick 1820. Thermal target 1822 may have a different temperature from other portions of flagstick 1820 and the surrounding scene, such as a golf course.

In an embodiment, thermal target 1822 may be maintained at a predetermined substantially constant temperature or within a predetermined range of temperatures using a power source, such as a battery, and a heater or cooler. The power source may include a solar panel, such as one or more solar photovoltaic modules, and a rechargeable battery. Thermal target 1822 may use the heater/cooler and the power source to emit thermal radiation 1832 at a different temperature and/or rate from thermal radiation emitted by other portions of flagstick 1820 and/or objects in the golf course, such as grass, water, rocks, sand, and trees.

In another embodiment, thermal target 1822 includes material that absorbs and/or radiates heat at a different rate from a rate at which other portions of flagstick 1820 and/or objects in the golf course absorb and/or radiate heat. For example, thermal target 1822 may include material that absorbs energy such as sunlight at a relatively higher rate than other portions of flagstick 1820 and efficiently radiates heat such that thermal target 1822 emits thermal radiation 1832 at a higher rate relative to the rest of flagstick 1820 and the golf course.

In one embodiment, thermal-assisted rangefinder 1700 (e.g., processor 195) may be configured to generate image data such as thermal images from imaging module 1804, and to detect from the thermal images a contiguous region of pixels having a temperature approximately in the range of thermal target 1822, which may be predetermined by the manufacturer of thermal target 1822 or the operator of thermal target 1822, such as the golf course management. Such a pixel block may indicate a presence of thermal target 1822 within the field of view of device 1700, and may be analyzed further as described herein to ascertain the presence of thermal target 1822, track the motion of thermal target 1822, determine the location of thermal target 1822, and/or determine various other attributes associated with detected thermal target 1822.

Processor 195 may be configured to receive thermal image data captured by infrared imaging modules 100. Processor 195 may be configured to perform, on the received thermal images of a scene, various thermal image processing and analysis operations as further described herein, for example, to detect and track a thermal target such as thermal target 1822, and determine various attributes associated with thermal target 1822. Processor 195 may be configured to collect, compile, analyze, or otherwise process the outcome of the thermal image processing and analysis operations to generate monitoring information.

In one example, thermal-assisted rangefinder 1700 may be configured to determine the presence and location of thermal target 1820 using a thermal image and generate alignment guide information, which may include user-viewable cues, upon detection of thermal target 1820. In this regard, thermal-assisted rangefinder 1700 may be configured to detect and track the location of thermal target 1820 in the thermal images according to one or more embodiments of the disclosure. Thermal-assisted rangefinder 1700 may be configured to present the user-viewable cue to the user of device 1700 on a display of device 1700. User-viewable cues may include a graphic (e.g., a directional arrow), text, a framing reticle, etc. For example, an image, such as a user-viewable infrared image, a visible light image, or a combined image, presented on the display may include a frame reticle corresponding to the image of thermal target 1822 and an arrow pointing in the direction that user of device 1700 should move device 1700 to direct/orient light source 1712 of device 1700 to emit the light toward the flagstick.

In other embodiments, if visible light images captured by visible light cameras 1406 in imaging module 1804 are available, thermal-assisted rangefinder 1700 may be configured to detect and track thermal target 1820 based additionally or alternatively on the visible light images. For example, the visible light images may provide more detail and contrast than the thermal images in certain ambient light conditions, and thus may be analyzed using suitable target tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be analyzed to detect and track thermal target 1820. If thermal-assisted rangefinder 1700 is configured to detect and track the features of a scene using the visible light images, processor 195 may be further configured to convert pixel coordinates of the tracked features in the visible light images to corresponding pixel coordinates in the thermal images.

In other embodiments thermal-assisted rangefinder 1700 may be configured to calculate an approximate temperature of objects by performing appropriate processing and analysis operations on the thermal images and the radiometric data contained therein. In various embodiments, processor 195 may be configured to generate alignment guide information, such as user-viewable cue, if an object having the approximate temperature of thermal target 1820, as determined from the thermal images, is detected.

Figure 19:
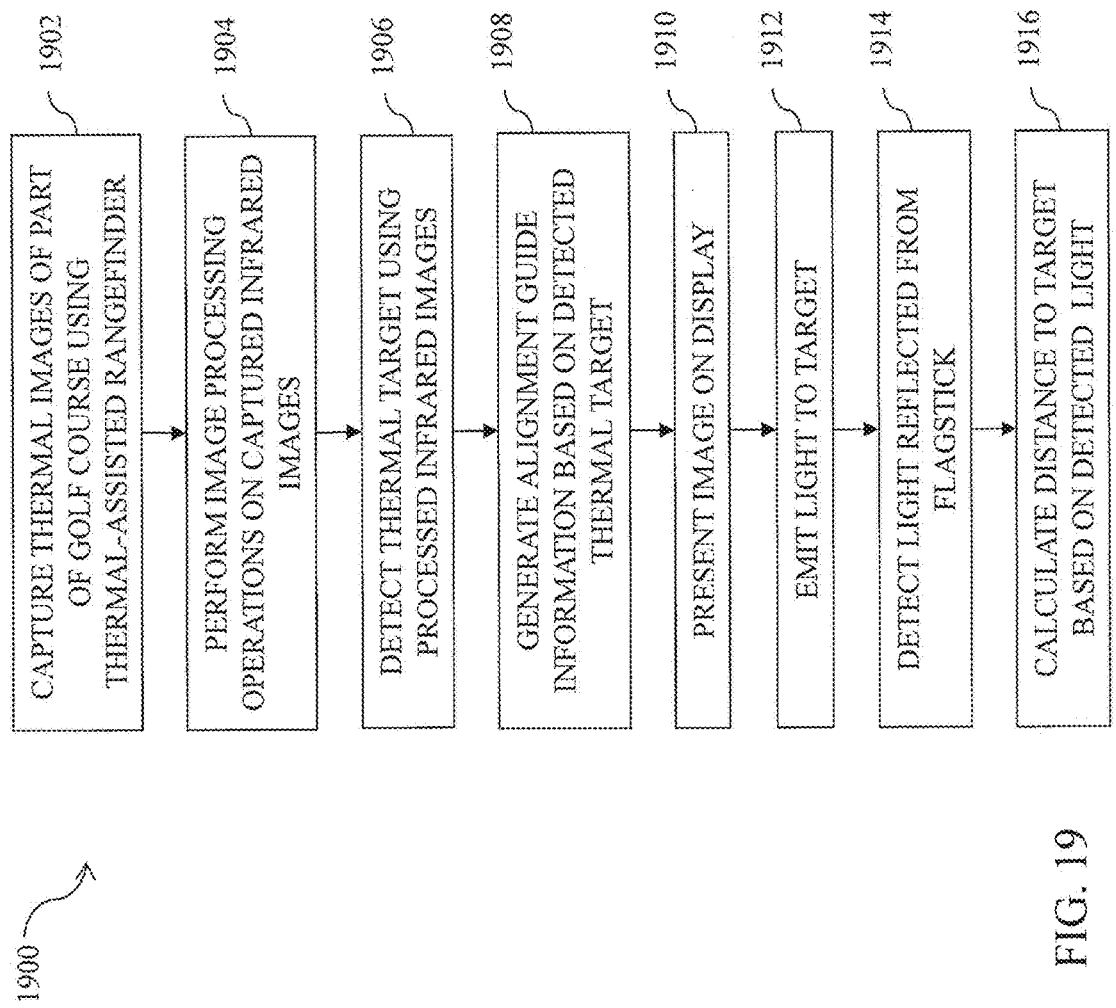
FIG. 19 illustrates a method for determining a distance to a flagstick using a thermal-assisted rangefinder in accordance with an embodiment of the disclosure.

Referring now to FIG. 19, a flowchart is illustrated of a process 1900 for determining a range using thermal-assisted rangefinder 1700.

At block 1902, thermal images (e.g., images containing pixels with image data generated in response to infrared radiation such as infrared light intensity values or radiometric temperature data values) of a scene, such as a part of a golf course, may be captured by one or more infrared imaging modules (e.g., infrared imaging modules 100 of thermal-assisted rangefinder 1700). The captured thermal images may be radiometrically calibrated thermal images as described above in connection with infrared imaging module 100 or may be uncalibrated thermal images. If desired, visible light images may also be captured at block 1902 using visible light cameras 1406 of thermal-assisted rangefinder 1700.

At block 1904, processing operations may be performed on the captured thei nal images. Processing operations may include NUC corrections, other noise corrections, calibration operations, smoothing operations, filtering operations, edge detection operations, perspective calibration operations or other image processing operations. Additional processing operations may also be performed on visible light images optionally captured at block 1902.

In an embodiment, thermal-assisted rangefinder 1700 (e.g., processor 195) may be configured to convert thermal images using appropriate methods and algorithms. In one embodiment, radiometric data (e.g., temperature data) contained in the pixels of the thermal images may be converted into gray-scaled or color-scaled pixels to construct an image that can be viewed by a person.

In some embodiments, if visible light images of the scene are available (e.g., captured by visible light camera 1406), image processing operations performed at block 1904 may include combining or fusing thermal images and visible light images as described above in connection with FIGS. 14 and 16 (as examples). Thermal-assisted rangefinder 1700 (e.g., processor 195) may be configured to superimpose, fuse, blend, or otherwise combine the thermal images and the visible light images to generate user-viewable image having a higher definition and/or contrast. For example, processor 195 may be configured to generate images that are combined images including radiometric data and/or other infrared characteristics corresponding to scene but with significantly more object detail (e.g., contour and/or edge detail) and/or contrast than typically provided by the thermal or visible light images alone, as further described herein. In another example, images may be combined images that include radiometric data and visible light characteristics (e.g., a visible spectrum color) corresponding to one or more objects (e.g., a thermal target of a flagstick) in scene (e.g., golf course), as described for appropriate embodiments disclosed in various patent applications referenced herein such as, for example, U.S. Patent Application Nos. 61/473,207, 61/746,069, 61/746,074, 61/792,582, 61/793,952, Ser. Nos. 12/766,739, 13/105,765, or 13/437,645, or International Patent Application No. PCT/EP2011/056432, or others as appropriate. Combined images generated in these examples may provide sufficient radiometric data, edge detail, and contrast to allow easier recognition and/or interpretation of the presence, location, and position of a detected thermal target.

In further embodiments, NUC correction processes may be performed on the captured thermal images to remove noise therein, for example, by using various NUC techniques disclosed herein. Also, in some embodiments, the captured thermal images may be scaled and/or perspective calibrated. Scaling and perspective calibration operations may be performed manually or automatically using scaling or perspective calibration data stored in memory 196.

At block 1906, a thermal target of a flagstick, such as flagstick 1822 of FIG. 18, may be detected and/or tracked using the processed thermal images. Detecting the thermal target may include identifying image pixels in the thermal images that correspond to the thermal target (e.g., the temperature of the thermal target) or otherwise identifying characteristics of an image that correspond to the desired thermal target to be detected. The thermal target may be tracked in continuously or subsequently captured images based on the infrared image and the detected thermal target. In an embodiment, thermal-assisted rangefinder 1700 may adjust a direction of a light source automatically to emit the light to the flagstick based on the tracked thermal target. For example, one or more movable optical components and/or light sources of rangefinder 1700 may be moved to redirect light such as laser light from the rangefinder to the detected target.

Various analysis and processing operations may be performed on the captured thermal images to detect and track objects such as thermal targets, and determine various attributes associated with the detected thermal target and/or the golf course. In one embodiment, regions of contiguous pixels having temperature values in a specific range may be detected from radiometrically calibrated thermal images for detection of the thermal target. For example, the detection operation may differentiate a region having a surface temperature distribution that is characteristic of a thermal target of a flagstick. The thermal images and the potential target detected therein may be further processed and/or analyzed, for example, by performing various filtering operations and analyzing the size, shape, and/or thermal characteristics of the potential target, to detect the thermal target and to further localize the thermal target.

In another embodiment, the thermal images may be analyzed to detect one or more candidate foreground objects, for example, using background modeling techniques, edge detection techniques, or other foreground object detection techniques suitable for use with thermal images. The radiometric properties (e.g., surface temperature) of the candidate objects may then be analyzed to determine whether they correspond to those of thermal target that may be present on the golf course. For example, rocks or trees or other objects may initially be detected as a candidate foreground object, but radiometric properties of the objects may then quickly reveal that they do not have a surface temperature characteristic of thermal target of a flagstick. As this example shows, object detection using the thermal images may be less susceptible to false detection of spurious objects compared with object detection techniques using visible light images or typical through-sight optics of a conventional rangefinder. The size and shape of the candidate objects may also be analyzed, so that the detection may be ascertained based on the size, the shape, and the radiometric properties of the detected candidates. As described above, further processing and analysis operations may be performed if needed to localize and track the features of the thermal target.

In one aspect of this embodiment, background modeling techniques may be used to detect the thermal target on the golf course. Because the background of the golf course rarely changes and because thermal images are generally insensitive to changing lighting conditions, a background model (e.g., pixels that belong to a background) may be constructed with high accuracy, and a region of pixels different from the background (also referred to as a "region of interest") may easily be distinguished as a candidate foreground object. As described above, the radiometric properties of such a region of interest (ROI) may then be analyzed to further ascertain whether the detected ROI likely represent a thermal target.

In various embodiments, the various processing and analysis operations described for block 1906 may be omitted or included, and may be performed in any order as appropriate for detecting a thermal target. For example, in some embodiments, detecting a relatively warm region or a relatively cold region in the thermal images may be sufficient to detect and track a thermal target in a golf course, whereas in other embodiments various thermal image analytics may be performed in combination to increase the accuracy of the detection.

In some embodiments, if visible light images are available (e.g., captured by visible light camera 1406), operations for block 1906 may additionally or alternatively involve performing suitable target detection and tracking algorithms on the visible light images or combined images of the visible light images and the thermal images. If the detection and tracking of the thermal target are performed using the visible light images, operations for block 1906 may further involve converting pixel coordinates of the tracked target in the visible light images to corresponding pixel coordinates in the thermal images. Other appropriate techniques for detecting the thermal target in the thermal images by analyzing the thermal images, visible light images, and/or combined images may also be utilized for block 1906.

In some embodiments, detecting and tracking the thermal target further includes determining the location of the detected thermal target. Determining the location of the detected thermal target may include determining the location of the thermal target within an image captured by a given imaging module in order to localize the determined location. Determining the location of the thermal target within a captured image may include determining which pixels in the image include the thermal target. Determining the location of the detected thermal target may include determining an angular position of the thermal target in a reference frame of the user of thermal-assisted rangefinder 1700. For example, a reference frame of the user may have an angular position of zero degrees for forward locations directly in front of the user. However, this is merely illustrative. If desired, angular positions of detected thermal target may be determined in any suitable reference frame or coordinate system, such as a reference frame that is fixed to the physical environment surrounding the user.

In some embodiments, additional thermal target information may be determined at block 1906 by further analysis and processing and/or during the processing and analysis performed for detection. For example, the approximate target temperature and the approximate ambient temperature may be determined by analyzing and processing the thermal images.

At block 1908, alignment guide information may be generated based on the detected thermal target. The alignment guide information may include a user-viewable cue, such as a graphic (e.g., a directional arrow), a text, a framing reticle, etc., that indicates how to direct/orient a light source to emit a light to the flag stick. In an embodiment, the alignment guide information may be provided to the user by presenting the user-viewable cue on a display. The user-viewable cue may be overlaid on the user's direct view of the scene through lenses 1726 via a transparent or semi-transparent display. In another embodiment, alignment guide information may be provided by auditory cue (e.g., "left" or "right") provided via a speaker.

At block 1910, images may be presented on a display of thermal-assisted rangefinder 1700. In an embodiment, user-viewable images of a part of the golf course including the detected thermal target may be generated and presented on the display. The user-viewable image may include a visible light image captured by visible light camera 1724 of visible light optical device 1720. The user may view the visible light image or a magnification of the visible light image on display 1722 of visible light optical device 1720. User-viewable cues may also be generated and presented on the display. The user-viewable cues may be overlaid on or combined with the user-visible image.

In another embodiment, visible light optical device 1720 of thermal-assisted rangefinder 1700 includes one or more optical lenses 1726, such as a telescope, to magnify the part of the golf course and a transparent or semi-transparent display, which may be an implementation of display 1722. The user may view a scene directly through lenses 1726 to view a magnified image of the part of the golf course. Providing a magnified view through lenses 1726 may be alternative to, or in addition to, presenting a magnified image on a display. User-viewable cues may be generated and presented on the transparent or semi-transparent display such that the user-viewable cues are overlaid on the user's direct view of the scene through lenses 1726.

Visible light optical device 1720 may include a reticle that is visible when viewing the display or viewing the scene directly through the lenses, the reticle indicating where the light source of thermal-assisted rangefinder 1700 is pointing. The reticle may be a physical or permanently drawn on feature of visible light optical device 1720, or a feature presented on a display. The reticle may change shape or form when it is overlaid on the thermal target.

In various embodiments, the image may be a user-viewable image generated based on captured infrared images (e.g., thermal images) at block 1904. The user-viewable image may be generated by converting thermal images using appropriate methods and algorithms into user-viewable images. For example, thermal data (e.g., temperature data) contained in the pixels of the thermal images may be converted into gray-scaled or color-scaled pixels to construct images that can be viewed by a person. The user-viewable thermal images may optionally include legends or scales that indicate the approximate temperatures and/or locations of detected objects. Generating the user-viewable image may include stitching together image data from multiple imaging modules, combining thermal and visible light images, overlaying a thermal image on a direct or display view of a scene, overlaying a thermal image of a target on a direct or display view of a scene, or otherwise processing or combining image data to generate user viewable images. The combined image may be an infrared image with additional of visible light image data. The user-viewable image may be presented on display 197 of the thermal-assisted rangefinder 1700, or on an external display associated with another system. User-viewable cues may also be generated and presented with the user-viewable image, such as by overlaying the user viewable cues on the user-viewable image.

At block 1912, a light (e.g., a light beam such as a laser beam) is emitted by light source 1712 of thermal-assisted rangefinder 1700 is emitted onto the flagstick based on the detected thermal target. In one embodiment, the user may move device 1700 to center a reticle of visible light optical device 1720, which indicates where the light source is pointing, on the thermal target of the flagstick based on a provided thermal image of the thermal target. In another embodiment, thermal-assisted rangefinder 1700 may automatically direct the light from the light source toward the detected thermal target. In an embodiment, the light is emitted automatically when the light source is directed to the flagstick. Thermal-assisted rangefinder 1700 may determine that the light source is directed to the flagstick based on the detecting and tracking of the thermal source performed at block 1906. In another embodiment, the light is emitted when the user activates the light source (e.g., when the user presses a button or actuates a switch) on thermal-assisted rangefinder 1700.

In some embodiments, thermal-assisted rangefinder 1700 automatically adjusts a direction of the light source to emit the light to the flagstick. For example, when the user centers the reticle on the thermal target as close as he or she is able, thermal-assisted rangefinder 1700 may adjust the direction of the light source to emit the light to the flagstick more precisely. In another example, thermal-assisted rangefinder 1700 is configured to adjust the direction of the light source to emit the light to the flagstick when the flagstick is at an angle within a predetermined range from the direction of the light source. The predetermined angle range may be relatively large so that the user may point thermal-assisted rangefinder 1700 in the general direction of the flagstick to emit the light to the flagstick. When light such as laser light from the light source is incident on the flagstick (e.g., on a reflector of the flagstick), some or all of the light may be reflected from the flagstick onto a detector or receiver of thermal-assisted rangefinder 1700.

At block 1914, the portion of the emitted light that is reflected from the flagstick may be detected. The light may be reflected from any parts of the flagstick, such as the thermal source, the flag, or the stick. In an embodiment, the flagstick includes one or more retroreflectors, and the light is reflected by at least one of the one or more retroreflectors.

At block 1916, a distance to the flagstick may be calculated based on the detected light and the distance may be provided to a user of the thermal-assisted rangefinder. The distance to the flagstick may be substantially equal to the distance from thermal-assisted rangefinder 1700 to the flagstick. For example, the distance may be calculated based on the time of flight of the light. The time of flight may be the time taken for the light to travel from thermal-assisted rangefinder 1700 to the flagstick and return from the flagstick to thermal-assisted rangefinder 1700. The time of flight may be determined based on a rise in intensity detected at the receiver of the thermal-assisted rangefinder that corresponds to the rising edge of a pulse of laser light emitted by the light source or based on a detection of one or more other properties of the emitted light.

Figure 20:
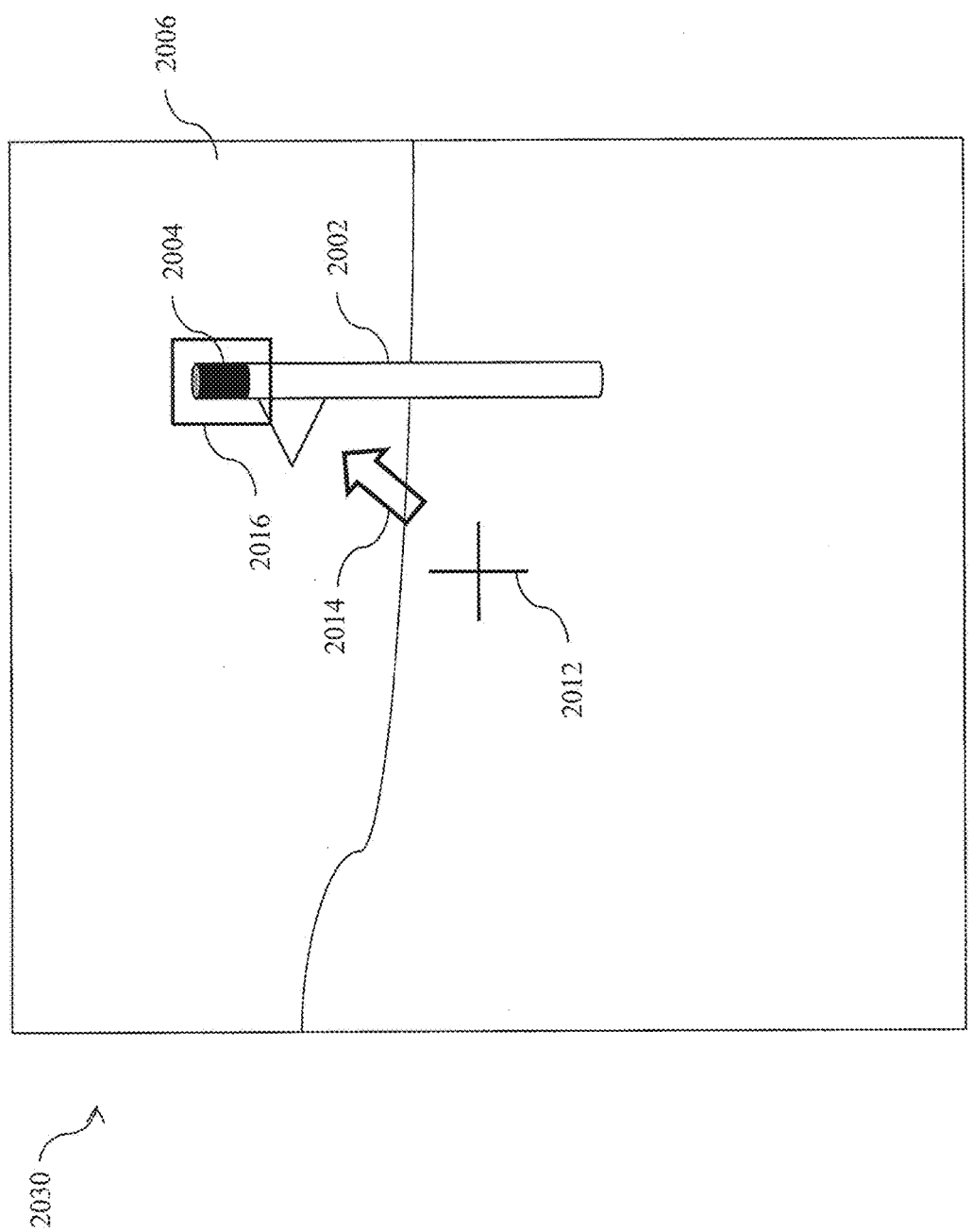
FIG. 20 illustrates a user-viewable image that may be presented to a user in accordance with an embodiment of the disclosure.

Referring to FIG. 20, a user-viewable image 2030 that may be presented to a user of a thermal-assisted rangefinder is illustrated. Image 2030 includes a part of a golf course 2006 including a flagstick 2002 that includes a thermal target 2004. Image 2030 may be a magnified image of the scene (e.g., 8 times magnification), which may be adjustable by the user.

In various embodiments, image 2030 includes a center reticle 2012 that indicates where light source 1712 of thermal-assisted rangefinder 1700 is pointing. Center reticle 1712 may be a circle, a cross as shown in FIG. 20, a combination of a circle and a cross, or other shape. When the light is emitted by light source 1712, the light travels in the direction indicated by center reticle 1700. Thus, when center reticle 2012 is centered on flagstick 2002, light is emitted to flagstick 2002.

In certain embodiments, image 2030 may include one or more user-viewable cues. The user-viewable cues may be generated as alignment guide information based on the infrared images captured by infrared imaging module 100 and the detected thermal target. For example, the user-viewable cues may include a graphic such as a directional arrow 2014, text, a framing reticle 2016 around thermal target 2004 in image 2030, etc. Framing reticle 2016 may dynamically follow thermal target 2004 when it moves in image 2030.

In an embodiment, visible light optical device 1720 includes one or more lenses 1726 and a transparent or semi-transparent display as described above in connection with FIG. 17. The user may view a scene, such as a part of the golf course, directly through lenses 1726. The directly viewed scene may be magnified by adjusting lenses 1726. Image 2030 presented to the user may include the directly viewed scene through lenses 1726 and the user-viewable cues overlaid on the directly viewed scene via a transparent or semi-transparent display.

In another embodiment, visible light optical device 1720 includes display 1722 and visible light camera 1724. Image 2030 may be based on a visible light image captured by visible light camera 1724. Image 2030 may include a visible light image, a magnified visible light image, and/or user-viewable cues (e.g., overlaid on the visible light image), and may be presented on a display, such as display 1722.

In another embodiment, image 2030 includes an image based on infrared image captured by infrared imaging module 100, such as a user-viewable thermal image or a user-viewable combined image, and user-viewable cues, and may be presented on a display. The user-viewable thermal image and the combined image may be magnified, for example, at a magnification set by the user. In some embodiments, the user may set which type of image is presented, or toggle between the various types of images.

The user may move device 1700 in the direction of arrow 2014 until reticle 2012 is centered on target 2004 (e.g., within framing reticle 2016). When reticle 2012 is centered on target 2004, a light source such as a laser may emit light such as laser light onto the flagstick for rangefinding operations as described herein. In some embodiments, automated components of device 1700 may alter the direction in which the light is emitted by the light source to emit the light onto the flagstick for rangefinding operations as described herein.

Although various image processing techniques have been described, any of the various processing techniques set forth in any of the patent applications referenced herein may be used. For example, in some embodiments, visible images and/or thermal images may be blended or otherwise combined in accordance with any of the techniques set forth in U.S. Patent Application Nos. 61/473,207, 61/746,069, 61/746,074, 61/792,582, 61/793,952, Ser. Nos. 12/766,739, 13/105,765, or 13/437,645, or International Patent Application No. PCT/EP2011/056432, or others as appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, comprising:
capturing an infrared image of a portion of a golf course including a flagstick, wherein the flagstick comprises a thermal target;
detecting the thermal target of the flagstick based on the infrared image;
providing a light to the flagstick based on the detected thermal target;
detecting at least a portion of the light that is reflected from the flagstick;
determining a distance to the flagstick based on the detected light; and
providing the distance.

2. The method of claim 1, further comprising:
generating alignment guide information based on the detected thermal target; and
providing the alignment guide information to a user.

3. The method of claim 2, wherein the alignment guide information comprises a user-viewable cue indicating how a light source should be directed to provide the light to the flagstick, and wherein the providing of the alignment guide information comprises presenting the user-viewable cue on a display.

4. The method of claim 1, further comprising:
capturing additional infrared images; and
tracking the thermal target based on the infrared image and the additional infrared images.

5. The method of claim 4, further comprising adjusting a direction of a light source to provide the light to the flagstick based on the tracking of the thermal target.

6. The method of claim 1, further comprising stabilizing the infrared image.

7. The method of claim 1, further comprising presenting a user-viewable image of the portion of the golf course including the flagstick on a display, wherein the user-viewable image is based on the infrared image.

8. The method of claim 1, further comprising:
capturing a visible light image of the portion of the golf course;
generating a combined image based on the visible light image and the infrared image; and
displaying the combined image using a display.

9. The method of claim 8, further comprising adjusting a temperature of the thermal target.

10. An apparatus for performing the method of claim 1, the apparatus comprising:
an infrared imaging module configured to capture the infrared image;
a light source configured to emit the light;
a light detector configured to detect the light;
a visible light optical device configured to magnify the portion of the golf course;
a processor configured to communicate with the infrared imaging module, wherein the processor is configured to:
operate the infrared imaging module to capture the infrared image of the portion of the golf course including the flagstick, wherein the flagstick comprises the thermal target;
operate the light detector to detect at least a portion of the light that is reflected from the flagstick;
determine the distance to the flagstick based on the detected light; and
provide the distance.

11. The apparatus of claim 10, wherein the processor is further configured to:
detect the thermal target of the flagstick based on the infrared image;
generate alignment guide information based on the detected thermal target, wherein the alignment guide information comprises a user-viewable cue indicating how the light source should be directed to emit the light to the flagstick; and
present the user-viewable cue on the visible light optical device.

12. The apparatus of claim 10, wherein the processor is further configured to:
operate the infrared imaging module to capture additional infrared images;
track the thermal target based on the infrared image and the additional infrared images; and
operate the light source to adjust a direction of the light source to emit the light to the flagstick based on the tracked thermal target.

13. The apparatus of claim 10, further comprising:
a visible light camera configured to capture a visible light image;
one or more image stabilization modules configured to stabilize the infrared image captured by the infrared imaging module or the visible light image captured by the visible light image, or both; and
the processor further configured to operate the visible light camera to capture the visible light image of the portion of the golf course including the flagstick, wherein the flagstick comprises the thermal target.

14. The apparatus of claim 10, wherein the visible light optical device comprises a lens for optical magnification.

15. The apparatus of claim 10, wherein the visible light optical device comprises:

a visible light camera configured to capture a visible light image of the portion of the golf course including the flagstick; and a display configured to present the visible light image or a magnification of the visible light image.

16. The apparatus of claim 15, wherein the processor is further configured to:

generate a combined image based on the visible light image and the infrared image, wherein the combined image is a contrast enhanced version of the infrared image with addition of visible light image data; and present the combined image on the display.

17. The apparatus of claim 10, wherein the infrared imaging module comprises an infrared microbolometer array, and wherein the infrared image is a thermal image.

18. A system comprising the apparatus of claim 10 and a flagstick, wherein the flagstick comprises:

a flag;

a thermal target configured to emit a thermal radiation; and a stick comprising a first end and a second end, wherein the flag and the thermal target are located closer to the first end than the second end, and wherein the second end is adapted to be placed in a golf hole.

19. A flagstick comprising:

a flag;

a thermal target configured to emit a thermal radiation; and a stick comprising a first end and a second end, wherein the flag and the thermal target are located closer to the first end than the second end, and wherein the second end is adapted to be placed in a golf hole.

20. The flagstick of claim 19, further comprising one or more retroreflectors adapted to reflect a light emitted by a light source, wherein the one or more retroreflectors are located closer to the first end than the second end, and wherein a temperature of the thermal target is adjustable.

* * * * *

UNITED STATES PATENT AND TRADEMARK OFFICE
CERTIFICATE OF CORRECTION

PATENT NO. : 10,232,237 B2
APPLICATION NO. : 14/850667
DATED : March 19, 2019
INVENTOR(S) : William A. Terre Page 1 of 1

It is certified that error appears in the above-identified patent and that said Letters Patent is hereby corrected as shown below:

In the Specification

In Column 3, Line 42, change "thettnal" to --thermal--.

In Column 12, Line 62, change "505:" to --505.--.

In Column 16, Line 21, change "teems" to --terms--.

In Column 16, Line 32, change "teens" to --terms--.

In Column 37, Line 30, change "theimal" to --thermal--.

In Column 39, Line 32, change "thei nal" to --thermal--.

Signed and Sealed this
Eighteenth Day of June, 2019

Andrei Iancu
*Director of the United States Patent and Trademark Office*